(12) United States Patent
Gould et al.

(10) Patent No.: US 8,868,580 B2
(45) Date of Patent: Oct. 21, 2014

(54) DATA PROFILING

(75) Inventors: Joel Gould, Winchester, MA (US); Carl Feynman, Waban, MA (US); Paul Bay, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 10/941,402

(22) Filed: Sep. 15, 2004

(65) Prior Publication Data

US 2005/0114369 A1    May 26, 2005

Related U.S. Application Data

(60) Provisional application No. 60/502,908, filed on Sep. 15, 2003, provisional application No. 60/513,038, filed on Oct. 20, 2003, provisional application No. 60/532,956, filed on Dec. 22, 2003.

(51) Int. Cl.
*G06F 17/30* (2006.01)

(52) U.S. Cl.
CPC .... *G06F 17/30466* (2013.01); *G06F 17/30539* (2013.01); *G06F 17/30489* (2013.01)
USPC ........................................................ 707/758

(58) Field of Classification Search
CPC .................. G06F 17/30539; G06F 17/30589; G06F 17/30572
USPC ......... 707/102, 770, 751, 758, 796, 736, 726, 707/737, 769, 802, 804, 806, 811, 673, 696
See application file for complete search history.

(56) References Cited

U.S. PATENT DOCUMENTS

| | | | |
|---|---|---|---|
| 5,179,643 A | 1/1993 | Homma et al. | |
| 5,742,806 A | 4/1998 | Reiner et al. | |
| 5,842,200 A | 11/1998 | Agrawal et al. | |
| 5,845,285 A | 12/1998 | Klein | |
| 5,966,072 A * | 10/1999 | Stanfill et al. | 340/440 |
| 6,134,560 A | 10/2000 | Kliebhan | |
| 6,138,123 A | 10/2000 | Rathbun | |

(Continued)

FOREIGN PATENT DOCUMENTS

| | | |
|---|---|---|
| EP | 1302871 | 4/2003 |
| JP | 03-002938 | 1/1991 |

(Continued)

OTHER PUBLICATIONS

Johnson, T. and T. Dasu "Comparing Massive High-Dimensional Data Sets", Proceedings of the 4th International Conference on Knowledge Discovery and Data Mining (KDD 98), Aug. 27-31, 1998, pp. 229-233.*

(Continued)

*Primary Examiner* — Anteneh Girma
*Assistant Examiner* — Fatima Mina
(74) *Attorney, Agent, or Firm* — Fish & Richardson P.C.

(57) ABSTRACT

Processing data includes profiling data from a data source, including reading the data from the data source, computing summary data characterizing the data while reading the data, and storing profile information that is based on the summary data. The data is then processed from the data source. This processing includes accessing the stored profile information and processing the data according to the accessed profile information.

28 Claims, 23 Drawing Sheets

(56) References Cited

U.S. PATENT DOCUMENTS

| | | | |
|---|---|---|---|
| 6,553,366 B1* | 4/2003 | Miller et al. | 707/2 |
| 6,601,048 B1* | 7/2003 | Gavan et al. | 706/10 |
| 6,741,995 B1* | 5/2004 | Chen et al. | 707/102 |
| 6,788,302 B1 | 9/2004 | Ditlow et al. | |
| 6,801,938 B1 | 10/2004 | Bookman et al. | |
| 6,959,300 B1* | 10/2005 | Caldwell et al. | 707/101 |
| 7,013,290 B2* | 3/2006 | Ananian | 705/26.42 |
| 7,047,230 B2* | 5/2006 | Gibbons | 707/2 |
| 7,058,819 B2* | 6/2006 | Okaue | 713/193 |
| 7,117,222 B2* | 10/2006 | Santosuosso | 707/101 |
| 7,376,656 B2 | 5/2008 | Blakeley et al. | |
| 7,403,942 B1* | 7/2008 | Bayliss | 707/748 |
| 7,433,861 B2* | 10/2008 | Santosuosso | 707/2 |
| 7,698,163 B2* | 4/2010 | Reed et al. | 705/7.33 |
| 7,756,873 B2 | 7/2010 | Gould et al. | |
| 7,813,937 B1* | 10/2010 | Pathria et al. | 705/2 |
| 7,849,075 B2 | 12/2010 | Gould et al. | |
| 8,296,274 B2 | 10/2012 | Leppard | |
| 2002/0120602 A1 | 8/2002 | Overbeek et al. | |
| 2002/0161778 A1* | 10/2002 | Linstedt | 707/102 |
| 2002/0198877 A1 | 12/2002 | Wolff et al. | |
| 2003/0023868 A1 | 1/2003 | Parent | |
| 2003/0033138 A1* | 2/2003 | Bangalore et al. | 704/205 |
| 2003/0140027 A1 | 7/2003 | Huttel et al. | |
| 2004/0023666 A1* | 2/2004 | Moon et al. | 455/456.1 |
| 2004/0049492 A1* | 3/2004 | Gibbons | 707/2 |
| 2004/0083199 A1* | 4/2004 | Govindugari et al. | 707/1 |
| 2004/0111410 A1* | 6/2004 | Burgoon et al. | 707/4 |
| 2004/0181514 A1* | 9/2004 | Santosuosso | 707/3 |
| 2004/0181533 A1* | 9/2004 | Santosuosso | 707/10 |
| 2004/0249810 A1* | 12/2004 | Das et al. | 707/5 |
| 2005/0065914 A1* | 3/2005 | Chang et al. | 707/3 |
| 2005/0114368 A1 | 5/2005 | Gould et al. | |
| 2005/0114369 A1 | 5/2005 | Gould et al. | |
| 2005/0192994 A1* | 9/2005 | Caldwell et al. | 707/101 |
| 2006/0041544 A1* | 2/2006 | Santosuosso | 707/4 |
| 2006/0294055 A1* | 12/2006 | Santosuosso | 707/1 |
| 2007/0073721 A1 | 3/2007 | Belyy et al. | |
| 2007/0299832 A1* | 12/2007 | Chang et al. | 707/3 |
| 2008/0306920 A1* | 12/2008 | Santosuosso | 707/3 |
| 2009/0216717 A1* | 8/2009 | Suereth et al. | 707/3 |
| 2010/0250563 A1 | 9/2010 | Cao et al. | |
| 2011/0225191 A1 | 9/2011 | Xie | |
| 2012/0197887 A1 | 8/2012 | Anderson | |
| 2013/0166576 A1 | 6/2013 | Hudzia et al. | |

FOREIGN PATENT DOCUMENTS

| | | |
|---|---|---|
| JP | H07-502617 | 3/1995 |
| JP | 08-030637 | 2/1996 |
| JP | 10-055367 | 2/1998 |
| JP | 10-091633 | 4/1998 |
| JP | 10-320423 | 12/1998 |
| JP | 11-238065 | 8/1999 |
| JP | 2002-024262 | 1/2002 |
| WO | WO 00/57312 | 9/2000 |
| WO | WO 00/79415 | 12/2000 |
| WO | WO 03/071450 | 8/2003 |
| WO | WO 2005/029369 | 3/2005 |

OTHER PUBLICATIONS

Dasu, T., T. Johnson, S. Muthukrishnan and V. Shkapenyuk "Mining Database Structure; Or, How to Build a Data Quality Browser", ACM SIGMOD '2002, Jun. 4-6, 2002, pp. 240-251.*
USPTO Non-Final Office Action issued for U.S. Appl. No. 10/941,401, mailed Jul. 21, 2009, 32 pages.
Canadian Office Action issued in application No. 2,655,731 dated Dec. 3, 2009, 3 pages.
Graefe, Goetz. "Query Evaluation Techniques for Large Databases." ACM Computing Surveys, vol. 25, No. 2, Jun. 1993, 98 pages.
Notification of Reason(s) for Refusal in Japanese Patent Application No. 2006-526986, mailed Oct. 13, 2010, 3 pages.
Summons to attend oral proceedings pursuant to Rule 115(a) EPC in EP application No. 04784113.5, dated Jul. 30, 2010, 8 pages.
Examiner's Report in Australian Application No. 2009200294, dated Jun. 12, 2012, 3 pages.
Apte, Chidanand, et al., "Business Application for Data Mining," Aug. 2002, Communications of the ACM, vol. 45, No. 8, pp. 49-53.
Huhtala, Y. et al., "Efficient Discovery of Functional and Approximate Dependencies Using Partitions (Extended Version)," University of Helsinki, Department of Computer Science Series of Publications C, Report C-1997-79, Nov. 1997.
Huhtala, Y. et al., "Efficient Discovery of Functional and Approximate Dependencies Using Paritions," Proceedings of the 14$^{th}$ International Conference on Data Engineering, Feb. 23-27, 1998, pp. 392-401.
IBM "Profiling: Take the First Step Toward Assuring Data Quality," white paper, GC-18-9728-00, Dec. 2005.
Kivinen, J and H. Mannila, "Approximate Inference of Functional Dependencies from Relations," Theoretical Computer Science, vol. 149, 1995, pp. 129-149.
Lopes, S. et al., "Efficient Discovery of Functional Dependencies and Armstrong Relations," Proceedings of the 7$^{th}$ International Conference on Extending Database Technology (EDBT 2000), LNCS 1777, Mar. 27-31, 2000, pp. 350-364.
Mannila, Heikki, "Theoretical Frameworks for Data Mining," Jan. 2000, SIGKDD Explorations, vol. 1, No. 2, pp. 30-32.
Milne, Robert et al., "Predicting Paper Making Defects On-line Using Data Mining," Jul. 24, 1998, Knowledge-Based Systems, vol. 11, pp. 331-338.
Novelli, N. et al., "FUN: An Efficient Algorithm for Mining Functional and Embedded Dependencies," Proceedings of the 8$^{th}$ International Conference on Database Theory (ICDT 2001), LNCS 1973, Jan. 4-6, 2001, pp. 189-203.
Office Action issued in Japanese Application No. 2006-526986, English Translation included, mailed Nov. 22, 2012, 61 pages.
Yan, Men in, et al., "Algorithm for discovering multivalued dependencies," 2001, ACM Proceedings of the 10$^{th}$ International Conference on Information and Knowledge Management, pp. 556-558.
Yao, H. et al., "FD_Mine: Discovering Functional Dependencies in a Database Using Equivalences," University of Regina, Department of Computer Science, Technical Report TR 2002-04, Aug. 2002.
Yao, H. et al., "FD_Mine: Discovering Functional Dependencies in a Database Using Equivalencies," Proceedings of the 2$^{nd}$ IEEE International Conference on Data Mining, Dec. 9-12, 2002, pp. 729-732.
Yao, Hong et al., "Mining functional dependencies from data," Sep. 15, 2007, Springer Science-Business Media, Data Mining and Knowledge Discovery, vol. 16, No. 2, pp. 197-219.
Yoon, Jong P., et al., "BitCube: A Three-Dimensional Bitmap Indexing for XML Documents," Journal of Intelligent Information Systems, 2001, 17:2/3, pp. 241-254.
Japanese Office Action, application No. 2010-153799, mailed Feb. 12, 2013, 4 pages.
Munakata, Koichi, "Integration of Distributed Heterogeneous Information Sources," with English Translation. Systems, Control and Information, Japan, The Institute of Systems, Control and Information Engineers, Dec. 15, 1996, vol. 40, No. 12, pp. 514-521.
Office Action issued in Japanese Application No. 2010-153799, English Translation included, mailed May 8, 2012, 6 pages.
Office Action issued in Japanese Application No. 2010-153800, English Translation included, mailed May 8, 2012, 5 pages.
"Ascential" http://www.ascentialsoftware.com (2003).
"Avellino" http://www.avellino.com (2003).
Chaudhuri, S., "An Overview of Query Optimization in Relational Systems", XP-000782631, pp. 34-43 (1998).
"Data Profiling: The Foundation for Data Management", prepared by DataFlux Corporation, XP-002313258, (2004).
"Evoke", http://www.evokesoftware.com, (2003).
Huhtala et al., "TANE: An Efficient Algorithm for Discovering Functional and Approximate Dependencies", The Computer Journal, vol. 42, No. 2 (1999).
Jaedicke, et al., On Parallel Processing of Aggregate and Scalar Functions in Object-Relational DBMS, XP-002313223, pp. 379-389 (1998).

(56) References Cited

OTHER PUBLICATIONS

Li et al., "A Practical External Sort for Shared Disk MPPs", http://www.thearling.com/text/sc93/sc93, 1993.

Olson, "Know Your Data: Data Profiling Solutions for Today's Hot Projects", XP-002313222, p. 1-4, published in DM Review, printed from DMReview.com (Mar. 2000).

Rahm, et al., "Data Cleaning: Problems and Current Approaches", XP-002284896 (2000).

Transaction History, U.S. Appl. No. 10/941,373, Jul. 30, 2013, 3 pages.

Transaction History, U.S. Appl. No. 10/941,401, Jul. 31, 2013, 3 pages.

Transaction History, U.S. Appl. No. 13/360,230, Jul. 31, 2013, 1 page.

Transaction History, U.S. Appl. No. 13/827,558, Jul. 31, 2013, 1 page.

Bagchi et al.. "Dependency Interference Algorithms for Relational Database Design." *Computers in Industry* 14 (1990) 319-350.

Bell et al.. "Discovery of Data Dependencies in Relational Databases." LS-8 Report 14, Dortmund, Apr. 3, 1995 1-18.

Bitton et al.. "A Feasibility and Performance Study of Dependency Inference." Department of Electrical Engineering and Computer Science, University of Illinois at Chicago (1989) 635-641.

Brown et al. . "BHUNT: Automatic Discovery of Fuzzy Algebraic Constraints in Relational Data." XP-002333907, 2003.

Bruno et al.. "Efficient Creation of Statistics over Query Expressions." The Computer Society (2003) 201-212.

Dasu et al. "Mining Database Structure; Or, How to Build a Data Quality Browser." XP-002333902, 240-251, 2002.

Henrard et al.. "Data Dependency Elicitation in Database Reverse Engineering." Institut d'Informattique, University of Namur, Belgium, (2001), 11-19.

Jahnke et al.. "Adaptive Tool Support for Database Reverse Engineering." AG-Softwaretechnik, Universität Paderborn, Germany (19990, 278-282.

Petit et al.. "Towards the Reverse Engineering of Denormalizes Relational Databases." Laboratoire d'Ingénierie des Systèmes d'Information, Lyon (1996), 218-227.

Wyss et al.. "FastFDs: A Heuristic-Driven, Depth-First Algorithm for Mining Functional Dependencies from Relation Instances." (Extended Abstract) Computer Science Department, Indiana University XP-002333906 101-110, 2001.

Alur et al. "IBM Websphere Information Analyzer and Data Quality Assessment", ibm.com/redbooks, Dec. 2007 p. 1-642, Retrieved from the Internet URL:http://www.ibm.com/redbooks/pdfs/sg247508.pdf.

Bell et al. "Discovery of Data Dependencies in Relational Databases" *Research Reports of the Unit No. VIII (AI), Computer Science Department of Dortmund, DE,* Apr. 1995, pp. 1-18.

International Search Report & Written Opinion, PCT/US2013/053351, Oct. 25, 2013, 10 pages.

Kandel et al. "Profiler: Integrated Statistical Analysis and Visualization for Data Quality Assessment" *AVI '12 Proceedings of the International Working Conference on Advanced Visual Interfaces*, pp. 1-8, May 2012.

Kouris In et al. "Using Information Retrieval Techniques for Supporting Data Mining" Data & Knowledge Engineering, Elsevier BC, NL, vol. 52, No. 3, Mar. 2005, pp. 353-383.

Lemire et al. "Sorting Improves Word-Aligned Bitmap Indexes" *Data & Knowledge Engineering*, Dec. 2009, pp. 1-43.

\* cited by examiner

Dataset profile: vermont_corps2.dat 2003-01-25 16:50:42

| | |
|---|---|
| Description | |
| Part Of Profile Output | Modified Vermont 2003-01-25 16:50:42 |
| Database Setup | Vermont Data |
| Physical Location | C:/DataProfile/SampleData/vermont_corps2.dat |
| Based On Dataset | vermont_corps2.dat |
| Profile Created On | 2003-01-25 16:54:15 |
| Profile Created By | jgould |
| Comments | |

Detailed Counts — 802

| | COUNT | PERCENT |
|---|---|---|
| Total Records | 68370 | 100.0 |
| Invalid Records | 848 | 1.38 |
| Total Value | 1299030 | 100.00 |
| Invalid Values | 948 | 0.07 |

Physical Elements Profiled — 804

| FIELD NAME | OF NOTE | DML TYPE | COUNT | VALIDS | INVALIDS | NULLS | NORMALS | DISTRICTS | DUPLICATES | UNSORTED |
|---|---|---|---|---|---|---|---|---|---|---|
| EN PREFIX | 3 district | string(1) | 68370 | 68370 | 0 | 0 | 68370 | 3 | 68367 | 3361 |
| EN SERIAL | | decimal(5) | 68370 | 68369 | 1 | 0 | 68369 | 5826 | 9544 | 4240 |
| EN SUFFIX | 4 district | decimal(1) | 68370 | 68369 | 1 | 0 | 68369 | 4 | 68366 | 42 |
| CORP TYPE | 16 district | string(1) = NULL(" ") | 68370 | 68364 | 4 | 2 | 68364 | 16 | 68354 | 7459 |
| CORP STATE | 91 district | string(2) = NULL(" ") | 68370 | 68135 | 0 | 235 | 68135 | 91 | 68279 | 8907 |
| COUNTRY | 99% null | string(2) = NULL(" ") | 68370 | 685 | 0 | 67685 | 685 | 52 | 68318 | 9 |
| CORPNAME | 779 duplicates | string(60) = NULL(" ") | 68370 | 68364 | 0 | 6 | 68364 | 67591 | 779 | 33655 |
| ABBREV | 8.8% null | string(1) = NULL(" ") | 68370 | 62351 | 0 | 6019 | 62351 | 25 | 68345 | 440 |
| CORP DESC | 16% null | string(30) = NULL(" "... | 68370 | 57094 | 0 | 11278 | 57094 | 23416 | 44954 | 25432 |
| CORP FEE | 27% null | decimal(4) = NULL(" "... | 68370 | 49728 | 4 | 18638 | 49728 | 64 | 68306 | 3188 |
| EIS YR END | 14% null | string(2) = NULL(" "... | 68370 | 58749 | 0 | 9621 | 56748 | 24 | 68346 | 10378 |

FIG. 8A

Physical Element Profile: vermont_corps2.dat 2003-01-23 21:38:07 LA_DTE

| | |
|---|---|
| Description | |
| Part of Database Profile | vermont_corps2.dat 2003-01-23 21:38:07 |
| Based on Physical Element | LA_DTE |
| Physical Element Type | date("YYYY/MM/DD")(~) = NULL(" ") |
| | |
| Number of values profiled | 68370 |
| All values distinct | no |
| All value identical | no |
| Values are sorted | no |
| | |
| Mean Value | 1992/05/09 |
| Minimum value found | 1900/01/31 |
| Maximum value found | 2002/12/31 |
| Standard deviation | 21.63 years |
| Average number of chars | 10.0 |
| Minimum number of chars | 10 |
| Maximum number of chars | 12 |
| Observed characters | -,./0-9Jan |
| | |
| Profile created on | 2003-01-23 21:41:42 |
| Profile created by | jgould |
| Comments | |

Detailed Counts

| | COUNT | PERCENT |
|---|---|---|
| Total values | 68370 | 100.0 |
| Valid values | 58166 | 85.08 |
| Invalid values | 927 | 1.36 |
| Null values | 9277 | 13.57 |
| Normal values | | |
| Distinct values | 846 | 1.24 |
| Ascending pairs | 22147 | 32.39 |
| Descending pairs | 22092 | 32.31 |

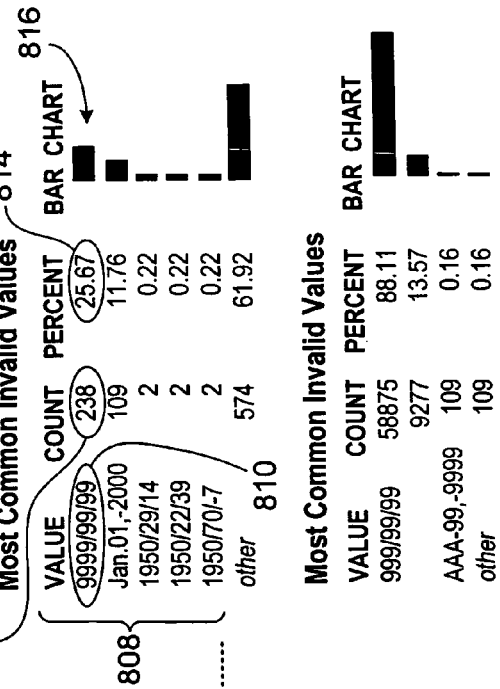

Most Common Values

| VALUE | COUNT | PERCENT | BAR CHART |
|---|---|---|---|
| 2001/12/31 | 15169 | 22.19 | ▇ |
| 1900/12/31 | 9277 | 13.57 | ▂ |
| 2000/12/31 | 2149 | 3.14 | ▁ |
| 2002/03/31 | 2071 | 3.03 | ▁ |
| other | 1748 | 2.56 | ▁ |
| | 37956 | 55.52 | ▇ |

806

812

Most Common Invalid Values — 814

| VALUE | COUNT | PERCENT | BAR CHART | 816 |
|---|---|---|---|---|
| 9999/99/99 | 238 | 25.67 | ▇ | |
| Jan.01,-2000 | 109 | 11.76 | ▃ | |
| 1950/29/14 | 2 | 0.22 | ▁ | |
| 1950/22/39 | 2 | 0.22 | ▁ | |
| 1950/70/-7 | 2 | 0.22 | ▁ | |
| other | 574 | 61.92 | ▇ | |

810

808

Most Common Invalid Values

| VALUE | COUNT | PERCENT | BAR CHART |
|---|---|---|---|
| 999/99/99 | 58875 | 88.11 | ▇ |
| | 9277 | 13.57 | ▂ |
| AAA-99,-9999 | 109 | 0.16 | ▁ |
| other | 109 | 0.16 | ▁ |

FIG. 8B

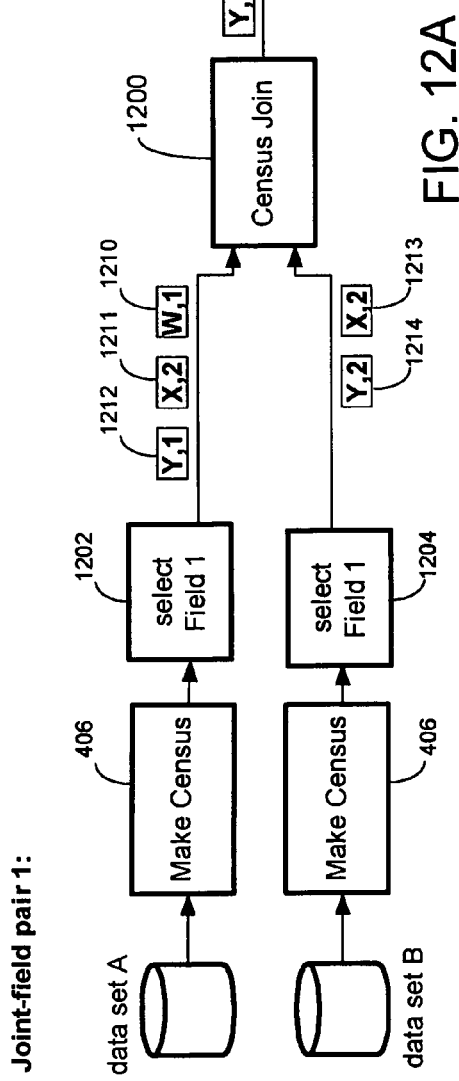
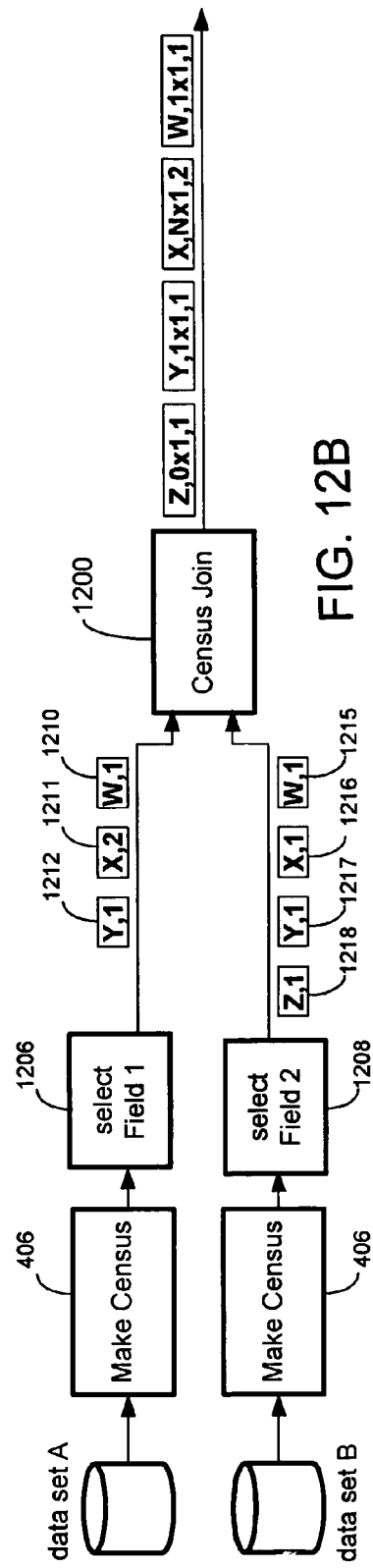
FIG. 12A
FIG. 12B

1600

| row | LastName | Citizenship | State | Zip |
|---|---|---|---|---|
| 1 | name_a | Canada | CA | 90019 |
| 2 | name_b | US | CA | 90019 |
| 3 | name_c | US | CA | 90019 |
| 4 | name_d | US | CA | 90019 |
| 5 | name_e | US | CA | 90212 |
| 6 | name_f | US | CA | 90212 |
| 7 | name_g | US | FL | 33102 |
| 8 | name_h | US | FL | 33102 |
| 9 | name_i | US | FL | 33102 |
| 10 | name_j | US | FL | 00000 |
| 11 | name_k | US | TX | 77010 |
| 12 | name_g | US | TX | 00000 |

DATA PROFILING

CROSS-REFERENCE TO RELATED APPLICATIONS

This application claims the benefit of U.S. Provisional Applications No. 60/502,908, filed Sep. 15, 2003, No. 60/513,038, filed Oct. 20, 2003, and No. 60/532,956, filed Dec. 22, 2003. The above referenced applications are incorporated herein by reference.

BACKGROUND

This invention relates to data profiling.

Stored data sets often include data for which various characteristics are not known beforehand. For example, ranges of values or typical values for a data set, relationships between different fields within the data set, or functional dependencies among values in different fields, may be unknown. Data profiling can involve examining a source of a data set in order to determine such characteristics. One use of data profiling systems is to collect information about a data set which is then used to design a staging area for loading the data set before further processing. Transformations necessary to map the data set to a desired target format and location can then be performed in the staging area based on the information collected in the data profiling. Such transformations may be necessary, for example, to make third-party data compatible with an existing data store, or to transfer data from a legacy computer system into a new computer system.

SUMMARY

In one aspect, in general, the invention features a method and corresponding software and a system for processing data. Data from a data source is profiled. This profiling includes reading the data from the data source, computing summary data characterizing the data while reading the data, and storing profile information that is based on the summary data. The data is then processed from the data source. This processing includes accessing the stored profile information and processing the data according to the accessed profile information.

In another aspect, in general, the invention features a method for processing data. Data from a data source is profiled. This profiling includes reading the data from the data source, computing summary data characterizing the data while reading the data, and storing profile information that is based on the summary data. Profiling the data includes profiling the data in parallel, including partitioning the data into parts and processing the parts using separate ones of a first set of parallel components.

Aspects of the invention can include one or more of the following features:

Processing the data from the data source includes reading the data from the data source.

Profiling the data is performed without maintaining a copy of the data outside the data source. For example, the data can include records with a variable record structure such as conditional fields and/or variable numbers of fields. Computing summary data while reading the data includes interpreting the variable record structure records while computing summary data characterizing the data.

The data source includes a data storage system, such as a database system, or a serial or parallel file system.

Computing the summary data includes counting a number of occurrences for each of a set of distinct values for a field.

The profile information can include statistics for the field based on the counted number of occurrences for said field.

A metadata store that contains metadata related to the data source is maintained. Storing the profile information can include updating the metadata related to the data source. Profiling the data and processing the data can each make use of metadata for the data source.

Profiling data from the data source further includes determining a format specification based on the profile information. It can also include determining a validation specification based on the profile information. Invalid records can be identified during the processing of the data based on the format specification and/or the validation specification.

Data transformation instructions are specified based on the profile information. Processing the data can then include applying the transformation instructions to the data.

Processing the data includes importing the data into a data storage subsystem. The data can be validated prior to importing the data into a data storage subsystem. Such validating of the data can include comparing characteristics of the data to reference characteristics for the data, such as by comparing statistical properties of the data.

The profiling of the data can be performed in parallel. This can include partitioning the data into parts and processing the parts using separate ones of a first set of parallel components. Computing the summary data for different fields of the data can include using separate ones of a second set of parallel components. Outputs of the first set of parallel components can be repartitioned to form inputs for the second set of parallel components. The data can be read from a parallel data source, each part of the parallel data source being processed by a different one of the first set of parallel components.

In another aspect, in general, the invention features a method and corresponding software and a system for processing data. Information characterizing values of a first field in records of a first data source and information characterizing values of a second field in records of a second data source are accepted. Quantities characterizing a relationship between the first field and the second field are then computed based on the accepted information. Information relating the first field and the second field is presented.

Aspects of the invention can include one or more of the following features.

The information relating the first field and the second field is presented to a user.

The first data source and the second data source are either the same data source, or are separate data sources. Either or both of the data source or sources can be a database table, or a file.

The quantities characterizing the relationship include quantities characterizing joint characteristics of the values of the first field and of the second field.

The information characterizing the values of the first field (or similarly of the second field) includes information characterizing a distribution of values of that field. Such information may be stored in a data structure, such as a "census" data structure. The information characterizing the distribution of values of the first field can include multiple data records, each associating a different value and a corresponding number of occurrences of that value in the first field in the first data source. Similarly, information characterizing the distribution of values of the second field can include multiple records of the same or similar format.

The information characterizing the distribution of values of the first field and of the second field is processed to compute quantities related to a multiple different categories of co-occurrence of values.

The quantities related to the categories of co-occurrence of values include multiple data records, each associated with one of the categories of co-occurrence and including a number of different values in the first and the second fields that are in that category.

Information characterizing a distribution of values in a "join" of the first data source and the second data source on the first field and the second field, respectively, is computed. This computation can include computing quantities related to a plurality of categories of co-occurrence of values. Examples of such categories include values that occur at least once in one of the first and the second fields but not in the other of the fields, values that occur exactly once in each of the first and the second fields, values that occur exactly once in one of the first and the second fields and more than once in the other of the fields, and values that occur more than once in each of the first and the second fields.

The steps of accepting information characterizing values and computing quantities characterizing joint characteristics of the values are repeated for multiple different pairs of fields, one of field from the first data source and the other field from the second data source. Information relating the fields of one or more of the plurality of pairs of fields can then be presented to the user.

Presenting the information relating the fields of one or more of the pairs of fields includes identifying candidate types of relationships of fields. Examples of such types of relationships of fields include a primary key and foreign key relationship and a common domain relationship.

In another aspect, in general, the invention features a method and corresponding software and a system for processing data. A plurality of subsets of fields of data records of a data source are identified. Co-occurrence statistics are determined for each of the plurality of subsets. One or more of the plurality of subsets is identified as having a functional relationship among the fields of the identified subset.

Aspects of the invention can include one or more of the following features.

At least one of the subsets of fields is a subset of two fields.

Identifying one or more of the plurality of subsets as having a functional relationship among the fields of the identified subset includes identifying one or more of the plurality of subsets as having one of a plurality of possible predetermined functional relationships.

Determining the co-occurrence statistics includes forming data elements each identifying a pair of fields and identifying a pair of values occurring in the pair of fields in one of the data records.

Determining the co-occurrence statistics includes partitioning the data records into parts, the data records having a first field and a second field, determining a quantity based on a distribution of values that occur in the second field of one or more records in a first of the parts, the one or more records having a common value occurring in a first field of the one or more records, and combining the quantity with other quantities from records in other of the parts to generate a total quantity.

Identifying one or more of the plurality of subsets as having a functional relationship among the fields of the identified subset includes identifying a functional relationship between the first and second fields based on the total quantity.

The parts are based on values of the first field and of the second field.

The parts are processed using separate ones of a set of parallel components.

Identifying one or more of the plurality of subsets as having a functional relationship among the fields of the identified subset includes determining a degree of match to the functional relationship.

The degree of match includes a number of exceptional records that are not consistent with the functional relationship.

The functional relationship includes a mapping of at least some of the values of a first field onto at least some of the values of a second field.

The mapping can be, for example, a many-to-one mapping, a one-to-many mapping, or a one-to-one mapping.

The method further includes filtering the plurality of subsets based on information characterizing values in fields of the plurality of subsets.

The data records include records of one or more database tables.

Aspects of the invention can include one or more of the following advantages.

Aspects of the invention provide advantages in a variety of scenarios. For example, in developing an application, a developer may use an input data set to test the application. The output of the application run using the test data set is compared against expected test results, or inspected manually. However, when the application is run using a realistic "production data," the results may be usually too large to be verified by inspection. Data profiling can be used to verify the application behavior. Instead of inspecting every record produced by running the application using production data, a profile of the output is inspected. The data profiling can detect invalid or unexpected values, as well as unexpected patterns or distributions in the output that could signal an application design problem.

In another scenario, data profiling can be used as part of a production process. For example, input data that is part of a regular product run can be profiled. After the data profiling has finished, a processing module can load the profiling results and verify that the input data meets certain quality metrics. If the input data looks bad, the product run can be cancelled and the appropriate people alerted.

In another scenario, a periodic audit of a large collection of data (e.g., hundreds of database tables in multiple sets of data) can be performed by profiling the data regularly. For example, data profiling can be performed every night on a subset of the data. The data that is profiled can be cycled such that all of the data is profiled, e.g., once a quarter so that every database table will be profiled four times a year. This provides an historic data quality audit on all of the data that can be referred to later, if necessary.

The data profiling can be performed automatically. For example, the data profiling can be performed from a script (e.g., a shell script) and integrated with other forms of processing. Results of the data profiling can be automatically published, e.g., in a form that can be displayed in a web browser, without having to manually post-process the results or run a separate reporting application.

Operating on information characterizing values of the records in the data sources rather than necessarily operating directly on the records of the data sources themselves can reduce the amount of computation considerably. For example, using census data rather than the raw data records reduces the complexity of computing characteristics of a join on two fields from being of the order of the product of the number of data records in the two data sources to being of the order of the product of the number of unique values in the two data sources.

Profiling the data without maintaining a copy of the data outside the data source can avoid potential for errors associated with maintaining duplicate copies and avoids using extra storage space for a copy of the data.

The operations may be parallelized according to data value, thereby enabling efficient distributed processing.

Quantities characterizing a relationship between fields can provide an indication of which fields may be related by different types of relationships. The user may then be able to examine the data more closely to determine whether the fields truly form that type of relationship.

Determining co-occurrence statistics for each of a plurality of subsets of fields of data records of a data source enables efficient identification of potential functional relationships among the fields.

Aspects of the invention can be useful in profiling data sets with which the user is not familiar. The information that is automatically determined, or which is determined in cooperation with the user, can be used to populate metadata for the data sources, which can then be used for further processing.

Other features and advantages of the invention are apparent from the following description, and from the claims.

DESCRIPTION OF DRAWINGS

FIGS. 8A-C are example user interface screen outputs showing profiling results.

FIGS. 12A-B are two examples of a census join operation on census records from two pairs of fields.

DESCRIPTION

1 Overview

Figure 1:
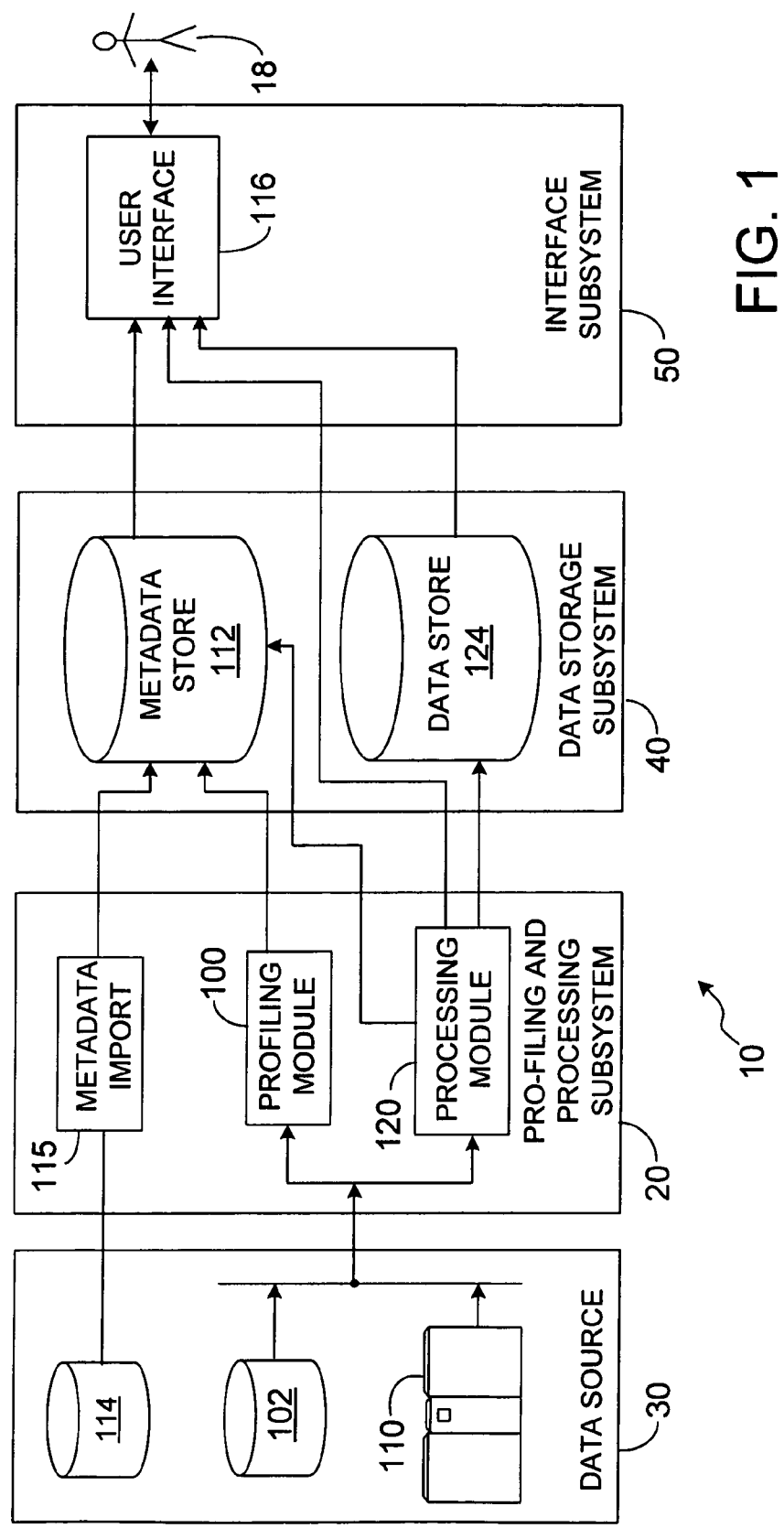
FIG. 1 is a block diagram of a system that includes a data profiling module.

Referring to FIG. 1, a data processing system 10 includes a profiling and processing subsystem 20, which is used to process data from data sources 30 and to update a metadata store 112 and a data store 124 in a data storage subsystem 40. The stored metadata and data is then accessible to users using an interface subsystem 50.

Data sources 30 in general includes a variety of individual data sources, each of which may have unique storage formats and interfaces (for example, database tables, spreadsheet files, flat text files, or a native format used by a mainframe 110). The individual data sources may be local to the profiling and processing sub-system 20, for example, being hosted on the same computer system (e.g., file 102), or may be remote to the profiling and processing sub-system 20, for example, being hosted on a remote computer (e.g., mainframe 110) that is accessed over a local or wide area data network.

Data storage sub-system 40 includes a data store 124 as well as a metadata store 112. Metadata store 112 includes information related to data in data sources 30 as well as information about data in data store 124. Such information can include record formats as well as specifications for determining the validity of field values in those records (validation specifications).

The metadata store 112 can be used to store initial information about a data set in data sources 30 to be profiled, as well as information obtained about such a data set, as well as data sets in data store 124 derived from that data set, during the profiling process. The data store 124 can be used to store data, which has been read from the data sources 30, optionally transformed using information derived from data profiling.

The profiling and processing subsystem 20 includes a profiling module 100, which reads data directly from a data source without necessarily landing a complete copy of the data to a storage medium before profiling in units of discrete work elements such as individual records. Typically, a record is associated with a set of data fields, each field having a particular value for each record (including possibly a null value). The records in a data source may have a fixed record structure in which each record includes the same fields. Alternatively, records may have a variable record structure, for example, including variable length vectors or conditional fields. In the case of variable record structure, the records are processed without necessarily storing a "flattened" (i.e., fixed record structure) copy of the data prior to profiling.

When first reading data from a data source, the profiling module 100 typically starts with some initial format information about records in that data source. (Note that in some circumstances, even the record structure of the data source may not be known). The initial information about records can include the number of bits that represent a distinct value (e.g., 16 bits (=2 bytes)) and the order of values, including values associated with record fields and values associated with tags or delimiters, and the type of value (e.g., string, signed/unsigned integer) represented by the bits. This information about records of a data source is specified in a data manipulation language (DML) file that is stored in a metadata store 112. The profiling module 100 can use predefined DML files to automatically interpret data from a variety of common data system formats (e.g., SQL tables, XML files, CSV files) or use a DML file obtained from the metadata store 112 describing a customized data system format.

Partial, possibly inaccurate, initial information about records of a data source may be available to the profiling and processing subsystem 20 prior to the profiling module 100 initial reading of the data. For example, a COBOL copy book associated with a data source may be available as stored data 114, or entered by a user 118 through a user interface 116. Such existing information is processed by a metadata import module 115 and stored in the metadata store 112 and/or used to define the DML file used to access the data source.

As the profiling module 100 reads records from a data source, it computes statistics and other descriptive information that reflect the contents of the data set. The profiling module 100 then writes those statistics and descriptive information in the form of a "profile" into the metadata store 112 which can then be examined through the user interface 116 or any other module with access to the metadata store 112. The statistics in the profile preferably include a histogram of values in each field, maximum, minimum, and mean values, and samples of the least common and most common values.

The statistics obtained by reading from the data source can be used for a variety of uses. Such uses can include discovering the contents of unfamiliar data sets, building up a collection of metadata associated with a data set, examining third-party data before purchasing or using it, and implementing a quality control scheme for collected data. Procedures for using the data processing system 10 to perform such tasks are described in detail below.

The metadata store 112 is able to store validation information associated with each profiled field, for example as a validation specification that encodes the validation information. Alternatively, the validation information can be stored in an external storage location and retrieved by the profiling module 100. Before a data set is profiled, the validation information may specify a valid data type for each field. For example, if a field is a person's "title", a default valid value may be any value that is a "string" data type. A user may also supply valid values such as "Mr.", "Mrs." and "Dr." prior to profiling the data source so that any other value read by the profiling module 100 would be identified as invalid. Information obtained from a profiling run can also be used by a user to specify valid values for a particular field. For example, the user may find that after profiling a data set the values "Ms." and "Msr." appear as common values. The user may add "Ms." as a valid value, and map the value "Msr." to the value "Mrs." as a data cleaning option. Thus, the validation information can include valid values and mapping information to permit cleaning of invalid values by mapping them onto valid values. The profiling of a data source may be undertaken in an iterative manner as more information about the data source is discovered through successive profiling runs.

The profiling module 100 can also generate executable code to implement other modules that can access the profiled data systems. For example, a processing module 120 can include code generated by the profiling module 100. An example of such code might map a value "Msr." to "Mrs." as part of the access procedure to the data source. The processing module 120 may run in the same runtime environment as the profiling module 100, and preferably can communicate with the metadata store 112 to access a profile associated with a data set. The processing module 120 can read the same data formats as the profiling module 100 (e.g., by obtaining the same DML file from the metadata store 112). The processing module 120 can use the data set profile to obtain values used to validate or clean incoming records before storing them in a data store 124.

Similar to the profiling module 100, the processing module 120 also reads data directly from a data system in units of discrete work elements. This "data flow" of work elements has the benefit of allowing the data profiling to be performed on large data sets without necessarily copying data to local storage (e.g., a disk drive). This data flow model, described in more detail below, also allows complex data transformations to be performed by a processing module without the source data being first copied to a staging area, potentially saving storage space and time.

2 Metadata Store Organization

Figure 2:
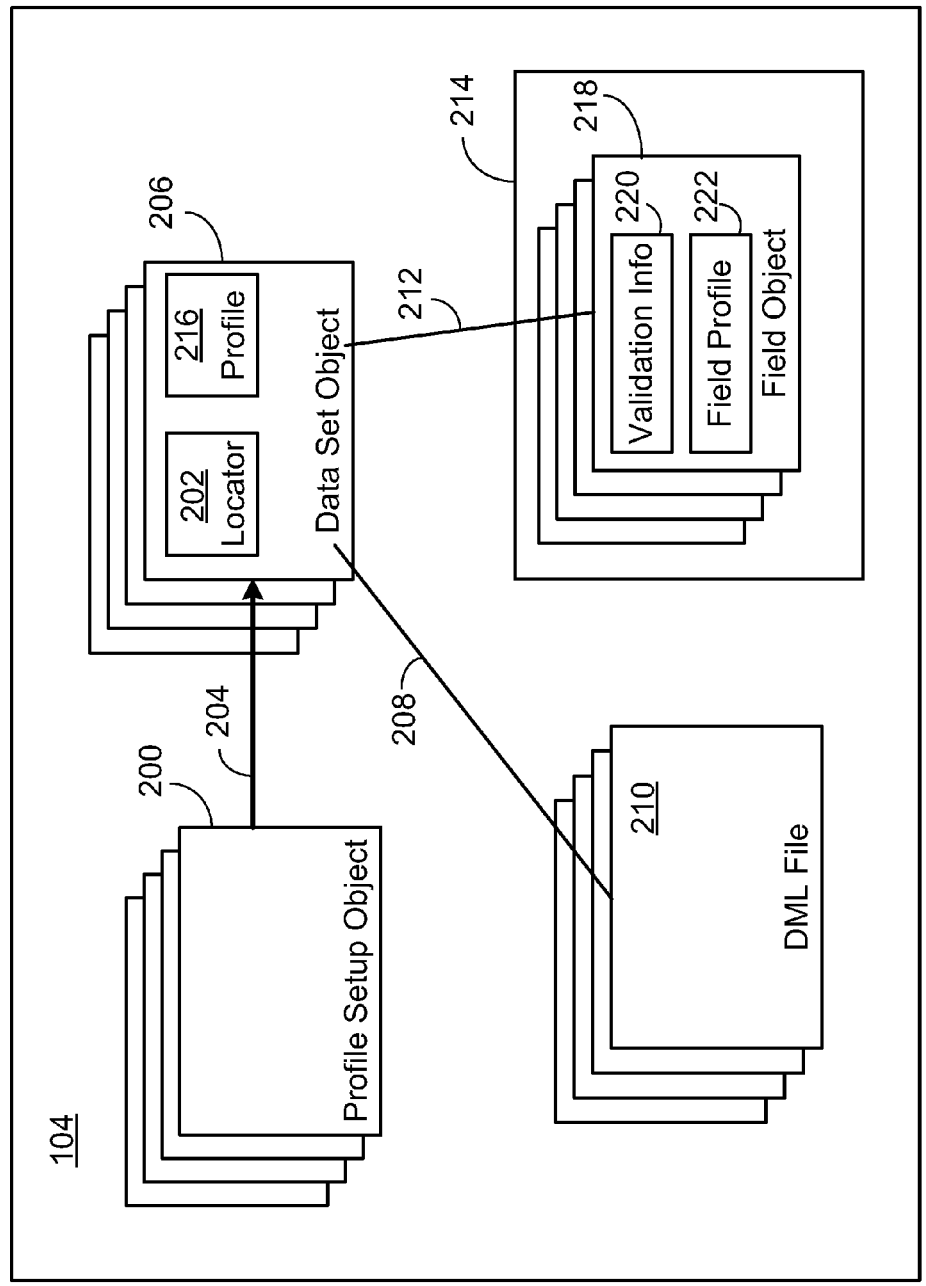
FIG. 2 is a block diagram that illustrates the organization of objects in a metadata store used for data profiling.

The profiling module 100 uses the metadata store 112 to organize and store various metadata and profiling preferences and results in data objects. Referring to FIG. 2, the metadata store 112 may store a group of profile setup objects 201, each for information related to a profiling job, a group of data set objects 207, each for information related to a data set, and a group of DML files 211, each describing a particular data format. A profile setup object contains preferences for a profiling run executed by the profiling module 100. A user 118 can enter information used to create a new profile setup object or select a pre-stored profile setup object 200.

The profile setup object 200 contains a reference 204 to a data set object 206. A data set setup object 206 contains a data set locator 202 which enables the profiling module 100 to locate data to be profiled on one or more data systems accessible within the runtime environment. The data set locator 202 is typically a path/filename, URL, or a list of path/filenames and/or URLs for a data set spread over multiple locations. The data set object 206 can optionally contain a reference 208 to one or more DML files 210.

The DML file(s) 210 may be pre-selected based on knowledge about the format of data in a data set, or may be specified at runtime by a user. The profiling module 100 can obtain an initial portion of the data set and present to the user over the user interface 116 an interpretation of the initial portion based on a default DML file. The user may then modify the default DML file specification based on an interactive view of the interpretation. More than one DML file may be referenced if the data set includes data with multiple formats.

The data set object 206 contains a reference 212 to a set of field objects 214. There is one field object for each field within the records of the data set to be profiled. Upon completion of a profiling run performed by the profiling module 100, a data set profile 216 is contained within the data set object 206 corresponding to the data set that was profiled. The data set profile 216 contains statistics that relate to the data set, such as total number of records and total number of valid/invalid records.

A field object 218 can optionally contain validation information 220 that can be used by the profiling module 100 to determine valid values for the corresponding field, and specify rules for cleaning invalid values (i.e., mapping invalid values onto valid values). The field object 218 also contains a field profile 222, stored by the profiling module 100 upon completion of a profiling run, which contains statistics that relate to the corresponding field, such as numbers of distinct values, null values, and valid/invalid values. The field profile 222 can also include sample values such as maximum, minimum, most common, and least common values. A complete "profile" includes the data set profile 216 and field profiles for all of the profiled fields.

Other user preferences for a profiler run can be collected and stored in the profile setup object 200, or in the data set object 206. For example, the user can select a filter expression which can be used to limit the fields or number of values profiled, including profiling a random sample of the values (e.g., 1%).

3 Runtime Environment

The profiling module 100 executes in a runtime environment that allows data from the data source(s) to be read and processed as a flow of discrete work elements. The computations performed by the profiling module 100 and processing module 120 can be expressed in terms of data flow through a directed graph, with components of the computations being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS. Graphs made in accordance with this system provide methods for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets, or use shared memory to pass data between the processes).

The runtime environment also provides for the profiling module 100 to execute as a parallel process. The same type of graphic representation described above may be used to describe parallel processing systems. For purposes of this discussion, parallel processing systems include any configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. Again, the graphs will be composed of components (graph vertices) and flows (graph links). By explicitly or implicitly replicating elements of the graph (components and flows), it is possible to represent parallelism in a system.

A flow control mechanism is implemented using input queues for the links entering a component. This flow control mechanism allows data to flow between the components of a graph without being written to non-volatile local storage, such as a disk drive, which is typically large but slow. The input queues can be kept small enough to hold work elements in volatile memory, typically smaller and faster than non-volatile memory. This potential savings in storage space and time exists even for very large data sets. Components can use output buffers instead of, or in addition to, input queues.

When two components are connected by a flow, the upstream component sends work elements to the downstream component as long as the downstream component keeps consuming the work elements. If the downstream component falls behind, the upstream component will fill up the input queue of the downstream component and stop working until the input queue clears out again.

Computation graphs can be specified with various levels of abstraction. So a "sub-graph" containing components and links can be represented within another graph as a single component, showing only those links which connect to the rest of the graph.

4 Profiling Graph

Figure 3:
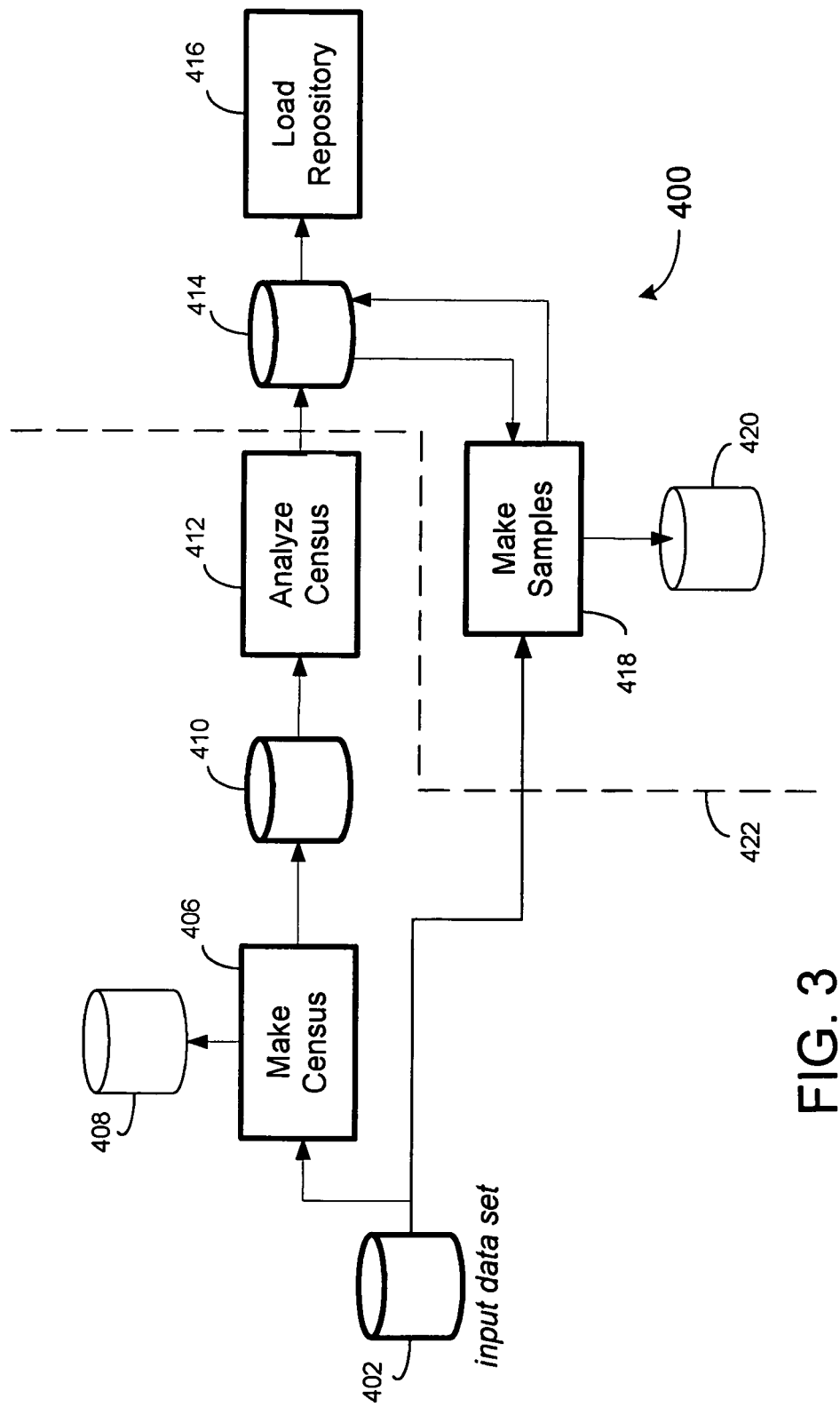
FIG. 3 is a profiling graph for the profiling module.

Referring to FIG. 3, in a preferred embodiment, a profiling graph 400 performs computations for the profiling module 100. An input data set component 402 represents data from potentially several types of data systems. The data systems may have different physical media types (e.g., magnetic, optical, magneto-optical) and/or different data format types (e.g., binary, database, spreadsheet, ASCII string, CSV, or XML). The input data set component 402 sends a data flow into a make census component 406. The make census component 406 conducts a "census" of the data set, creating a separate census record for each unique field/value pair in the records that flow into the component. Each census record includes a count of the number of occurrences of the unique field/value pair for that census record.

The make census component 406 has a cleaning option which can map a set of invalid values onto valid values according to validation information stored in a corresponding field object. The cleaning option can also store records having fields containing invalid values in a location represented by an invalid records component 408. The invalid records can then be examined, for example, by a user wanting to determine the source of an invalid value.

In the illustrated embodiment, the census records flowing out of the make census component 406 are stored in a file represented by the census file component 410. This intermediate storage of census records may, in some cases, increase efficiency for multiple graph components accessing the census records. Alternatively, the census records can flow directly from the make census component 406 to an analyze census component 412 without being stored in a file.

The analyze census component 412 creates a histogram of values for each field and performs other analyses of the data set based on the census records. In the illustrated embodiment, the field profiles component 414 represents an intermediate storage location for the field profiles. A load metadata store component 416 loads the field profiles and other profiling results into the corresponding objects in the metadata store 112.

The user interface 116 allows a user to browse through the analyzed data, for example, to see histograms or common values in fields. A "drill-down" capability is provided, for example, to view specific records that are associated with a bar in a histogram. The user can also update preferences through the user interface 116 based on results of the profiling.

The make samples component 418 stores a collection of sample records 420 representing a sampling of records associated with a value shown on the user interface 116 (e.g., associated with a bar in a histogram). The phase break line 422 represents two phases of execution in the graph 400, such that the components on the right side of the line begin execution after all the components on the left side of the line finish execution. Therefore, the make samples component 418 executes after the analyze census component 412 finishes storing results in the field profiles component 414. Alternatively, sample records can be retrieved from a recorded location in the input data set 402.

The profiling module 100 can be initiated by a user 118 or by an automated scheduling program. Upon initiation of the profiling module 100, a master script (not shown) collects any DML files and parameters to be used by the profiling graph 400 from the metadata store 112. Parameters can be obtained from objects such as the profile setup object 200, the data set object 206, and the field objects 218. If necessary, the master script can create a new DML file based on information supplied about the data set to be profiled. For convenience, the master script can compile the parameters into a job file. The master script may then execute the profiling graph 400 with the appropriate parameters from the job file, and present a progress display keeping track of the time elapsed and estimating time remaining before the profiling graph 400 completes execution. The estimated time remaining is calculated based on data (e.g., work elements) that is written to the metadata store 112 as the profiling graph 400 executes.

4.1 Data Format Interpretation

An import component implements the portion of the profiling module 100 that can interpret the data format of a wide variety of data systems. The import component is configured to directly interpret some data formats without using a DML file. For example, the import component can read data from a data system that uses structured query language (SQL), which is an ANSI standard computer language for accessing and manipulating databases. Other data formats that are handled without use of a DML file are, for example, text files formatted according to an XML standard or using comma-separated values (CSV).

For other data formats the import component uses a DML file specified in the profile setup object 200. A DML file can specify various aspects of interpreting and manipulating data in a data set. For example, a DML file can specify the following for a data set:

- type object—defines a correspondence between raw data and the values represented by the raw data.
- key specifier—defines ordering, partitioning, and grouping relationships among records.
- expression—defines a computation using values from constants, the fields of data records, or the results of other expressions to produce a new value.
- transform function—defines collections of rules and other logic used to produce one or more outputs records from zero or more input records.
- package—provides a convenient way of grouping type objects, transform functions, and variables that can be used by a component to perform various tasks.

A type object is the basic mechanism used to read individual work elements (e.g., individual records) from raw data in a data system. The runtime environment provides access to a physical computer-readable storage medium (e.g., a magnetic, optical, or magneto-optical medium) as a string of raw data bits (e.g., mounted in a file system or flowing over a network connection). The import component can access a DML file to determine how to read and interpret the raw data in order to generate a flow of work elements.

Figure 4:
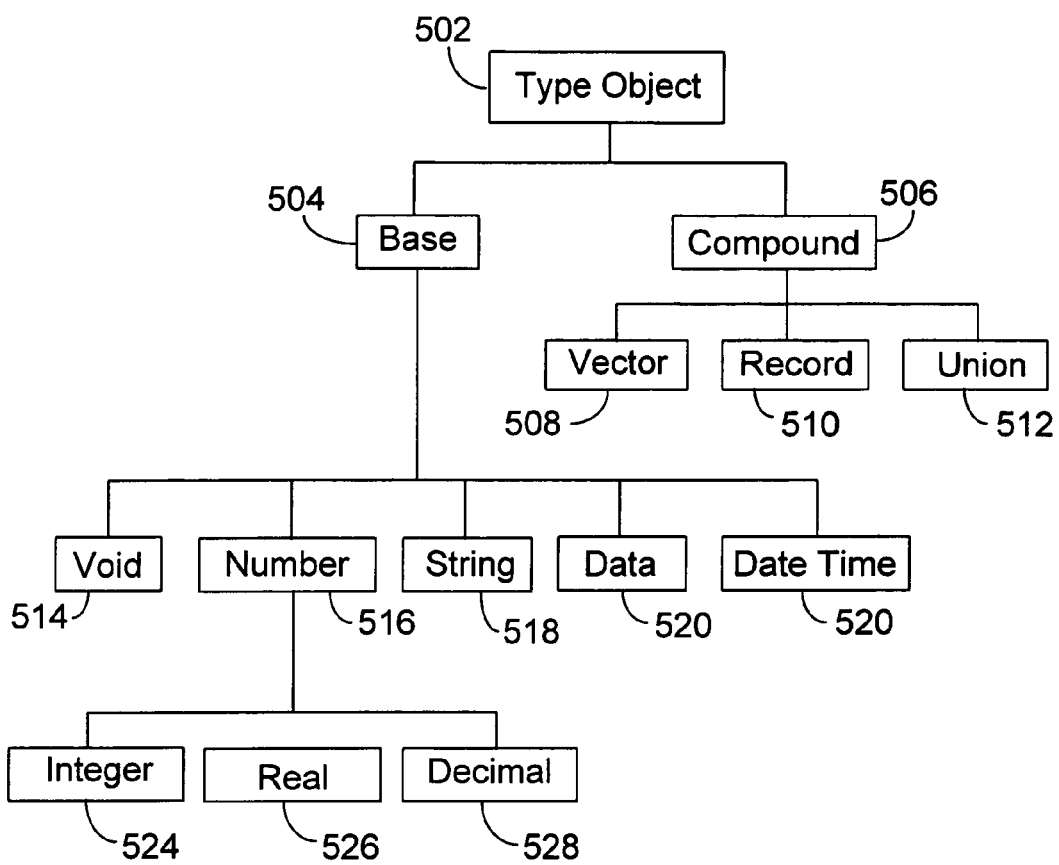
FIG. 4 is a tree diagram of a hierarchy for a type object used to interpret a data format.

Referring to FIG. 4, a type object 502 can be, for example, a base type 504 or a compound type 506. A base type object 504 specifies how to interpret a string of bits (of a given length) as a single value. The base type object 504 includes a length specification indicating the number of raw data bits to be read and parsed. A length specification can indicate a fixed length, such as a specified number of bytes, or a variable length, specifying a delimiter (e.g., a specific character or string) at the end of the data, or a number of (potentially variable length) characters to be read.

A void type 514 represents a block of data whose meaning or internal structure is unnecessary to interpret (e.g., compressed data that will not be interpreted until after it is decompressed). The length of a void type 514 is specified in bytes. A number type 516 represents a number and is interpreted differently if the number is designated an integer 524, real 526, or decimal 528, according to various encodings that are standard or native to a particular CPU. A string type 518 is used to interpret text with a specified character set. Date 520 and datetime 522 types are used to interpret a calendar date and/or time with a specified character set and other formatting information.

A compound type 506 is an object made up of multiple sub-objects which are themselves either base or compound types. A vector type 508 is an object containing a sequence of objects of the same type (either a base or compound type). The number of sub-objects in the vector (i.e., the length of the vector) can be indicated by a constant in the DML file or by a rule (e.g., a delimiter indicating the end of the vector) enabling profiling of vectors with varying lengths. A record type 510 is an object containing a sequence of objects, each of which can be a different base or compound type. Each object in the sequence corresponds to a value associated with a named field. Using a record type 510, a component can interpret a block of raw data to extract values for all of the fields of a record. A union type 512 is an object similar to a record type 510 except that objects corresponding to different fields may interpret the same raw data bits as different values. The union type 512 provides a way to have several interpretations of the same raw data.

The DML file also enables profiling of data with custom data types. A user can define a custom type object by supplying a type definition in terms of other DML type objects, either base or compound. A custom type object can then be used by the profiling module 100 to interpret data with a non-standard structure.

The DML file also enables profiling of data with a conditional structure. Records may only include some fields based on values associated with other fields. For example, a record may only include the field "spouse" if the value of the field "married" is "yes." The DML file includes a rule for determining whether a conditional field exists for a given record. If the conditional field does exist in a record, the value of the field can be interpreted by a DML type object.

The import component can be used by graphs to efficiently handle various types of record structures. The ability of the import component to interpret records with variable record structure such as conditional records or variable length vectors enables graphs to process such data without the need to first flatten such data into fixed length segments. Another type of processing that can be performed by graphs using the import component is discovery of relationships between or among parts of the data (e.g., across different records, tables, or files). Graphs can use a rule within the import component to find a relationship between a foreign key or field in one table to a primary key or field in another table, or to perform functional dependency calculations on parts of the data.

4.2 Statistics

Figure 5A:
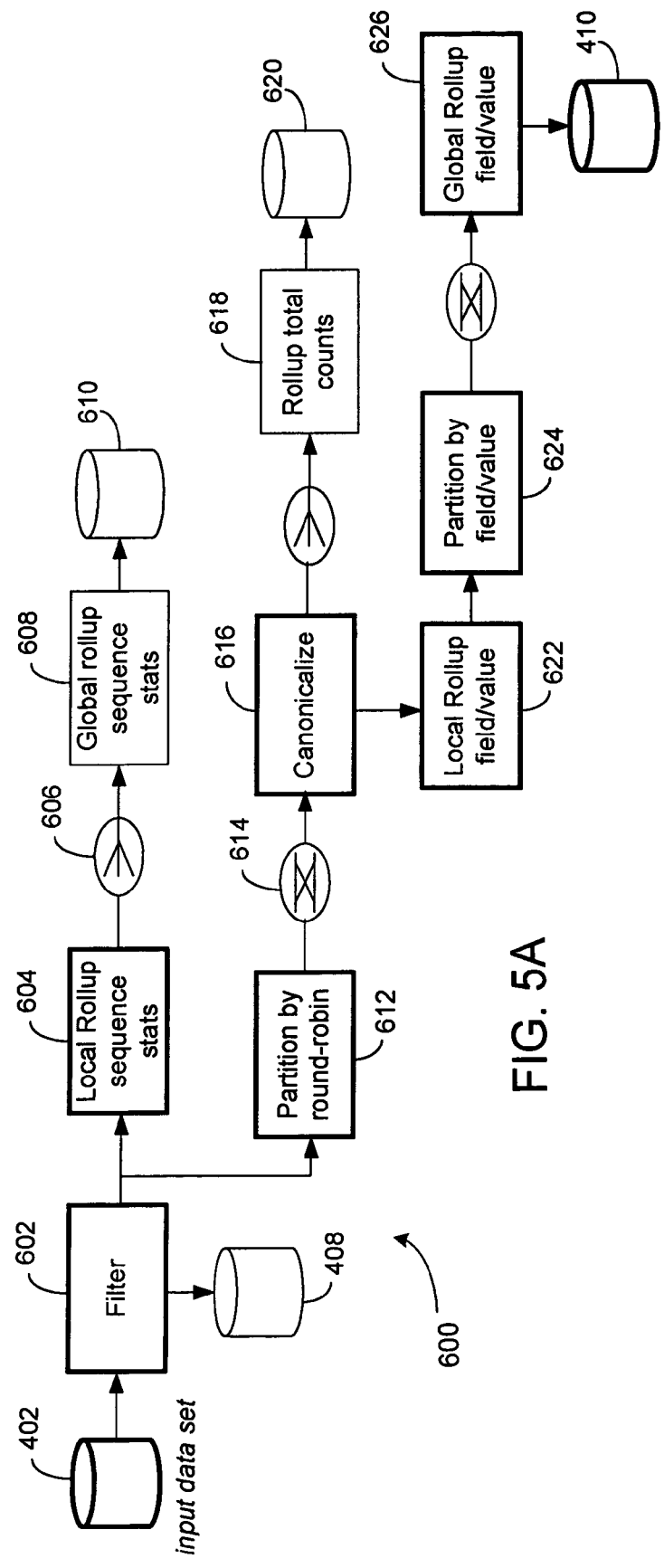
FIGS. 5A-C are diagrams that illustrates sub-graphs implementing the make census component, analyze census component, and make samples component of the profiling graph.

Referring to FIG. 5A, a sub-graph 600 implementing one embodiment of the make census component 406 includes a filter component 602 that passes a portion of incoming records based on a filter expression stored in the profile setup object 200. The filter expression may limit the fields or number of values profiled. An example of a filter expression is one that limits profiling to a single field of each incoming record (e.g., "title"). Another optional function of the filter component 602 is to implement the cleaning option described above, sending a sample of invalid records to the invalid records component 408. Records flowing out of the filter component 602 flow into a local rollup sequence stats component 604 and a partition by round-robin component 612.

The ability of the profiling graph 400 (and other graphs and sub-graphs) to run in parallel on multiple processors and/or computers, and the ability of the profiling graph 400 to read a parallel data set stored across multiple locations, are implicitly represented in the sub-graph 600 by line thicknesses of the components and symbols on the links between components. The thick border of components representing storage locations such as the input data set component 402 indicates that it may optionally be a parallel data set. The thick border of the process components such as the filter component 602 indicates that the process may optionally be running in multiple partitions with each partition running on a different processor or computer. The user can indicate through the user interface 116 whether to run the optionally parallel graph components in parallel or serially. A thin border indicates that a data set or process is serial.

The local rollup sequence stats component 604 computes statistics related to the sequential characteristics of the incoming records. For example, the component 604 may count the number of sequential pairs of records that have values for a field that increase, decrease, or increment by 1. In the case of parallel execution, the sequence statistics are calculated for each partition separately. A rollup process involves combining information from multiple input elements (sequence statistics for the rollup process performed by this component 604) and producing a single output element in place of the combined input elements. A gather link symbol 606 represents a combination or "gathering" of the data flows from any multiple partitions of a parallel component into a single data flow for a serial component. The global rollup sequence stats combines the "local" sequence statistics from multiple partitions into a single "global" collection of sequence statistics representing records from all of the partitions. The resulting sequence statistics may be stored in a temporary file 610.

Figure 6:
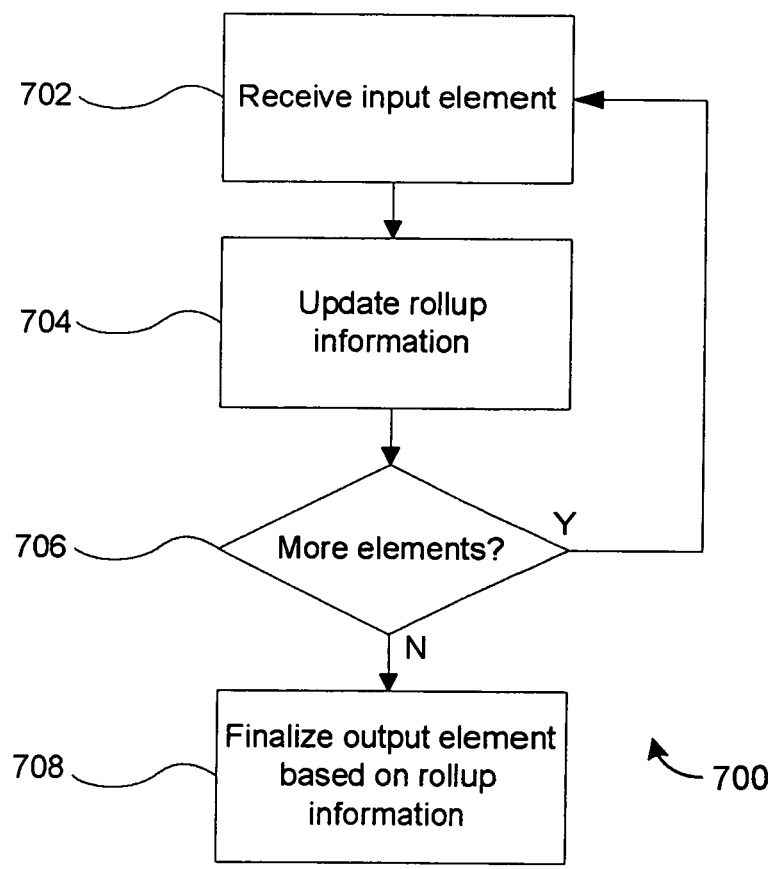
FIG. 6 is a flowchart for a rollup procedure.

FIG. 6 is a flowchart of an example of a process 700 for performing a rollup process, including the rollup processes performed by the local rollup sequence stats component 604 and the global rollup sequence stats component 608. The process 700 begins by receiving 702 an input element. The process 700 then updates 704 information being compiled, and determines 706 whether there are any more elements to be compiled. If there are more elements, the process 700 receives 702 the next element and updates 704 the information accordingly. When there are no more elements, the process 700 finalizes 708 the output element based on the compiled rollup information. A rollup process can be used to consolidate a group of elements into a single element, or to determine aggregate properties of a group of elements (such as statistics of values in those elements).

The partition by round-robin component 612 takes records from the single or multiple partitions of the input data set 402 and re-partitions the records among a number of parallel processors and/or computers (e.g., as selected by the user) in order to balance the work load among the processors and/or computers. A cross-connect link symbol 614 represents the re-partitioning of the data flows (performed by the linked component 612).

The canonicalize component 616 takes in a flow of records and sends out a flow of census elements containing a field/value pair representing values for each field in an input record. (An input record with ten fields yields a flow of ten census elements.) Each value is converted into a canonical (i.e., according to a pre-determined format) human readable string representation. Also included in the census element are flags indicating whether the value is valid and whether the value is null (i.e., corresponds to a pre-determined "null" value). The census elements flow into a local rollup field/value component which (for each partition) takes occurrences of the same value for the same field and combines them into one census element including a count of the number of occurrences. Another output of the canonicalize component 616 is a count of the total number of fields and values, which are gathered for all the partitions and combined in a rollup total counts component 618. The total counts are stored in a temporary file 620 for loading into the data set profile 216.

Figure 7:
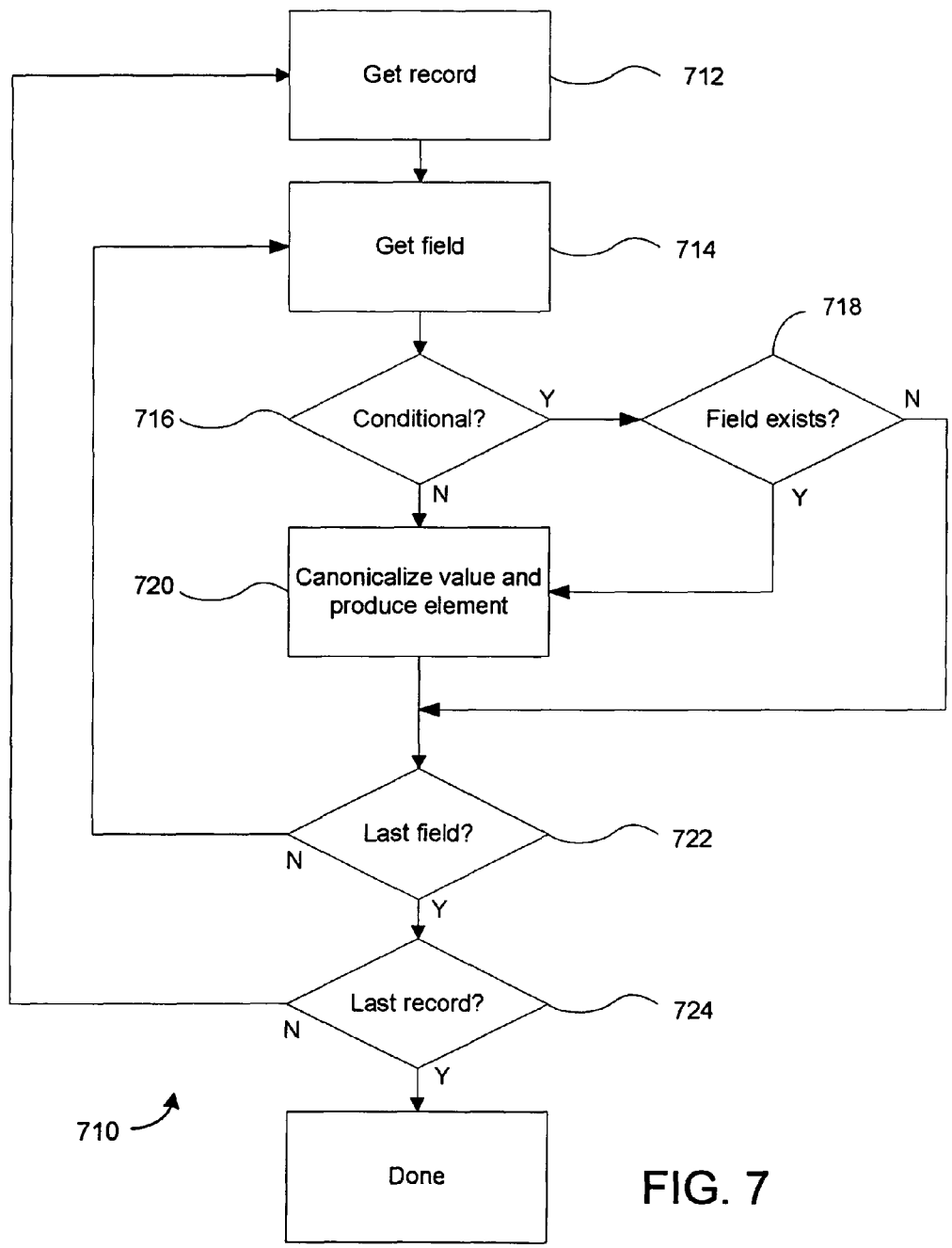
FIG. 7 is a flowchart for a canonicalize procedure.

FIG. 7 is a flowchart of an example of a process 710 performed by the canonicalize component that can handle conditional records, which may not all have the same fields, to produce a flow of census elements containing field/value pairs. The process 710 performs a nested loop which begins with getting 712 a new record. For each record, the process 710 gets 714 a field in that record and determines 716 whether that field is a conditional field. If the field is conditional, the process 710 determines 718 whether that field exists for that record. If the field does exist, the process 710 canonicalizes 720 the record's value for that field and produces a corresponding output element containing a field/value pair. If the field does not exist, the process 710 proceeds to determine 722 whether there is another field or to determine 724 whether there is another record. If the field is not conditional, the process 710 canonicalizes 720 the record's for that field (including possibly a null value) and proceeds to the next field or record.

The partition by field/value component 624 re-partitions the census elements by field and value so that the rollup process performed in the global rollup field/value component 626 can add the occurrences calculated in different partitions to produce a total occurrences count in a single census element for each unique field/value pair contained within the profiled records. The global rollup field/value component 626 processes these census elements in potentially multiple partitions for a potentially parallel file represented by the census file component 410.

Figure 5B:
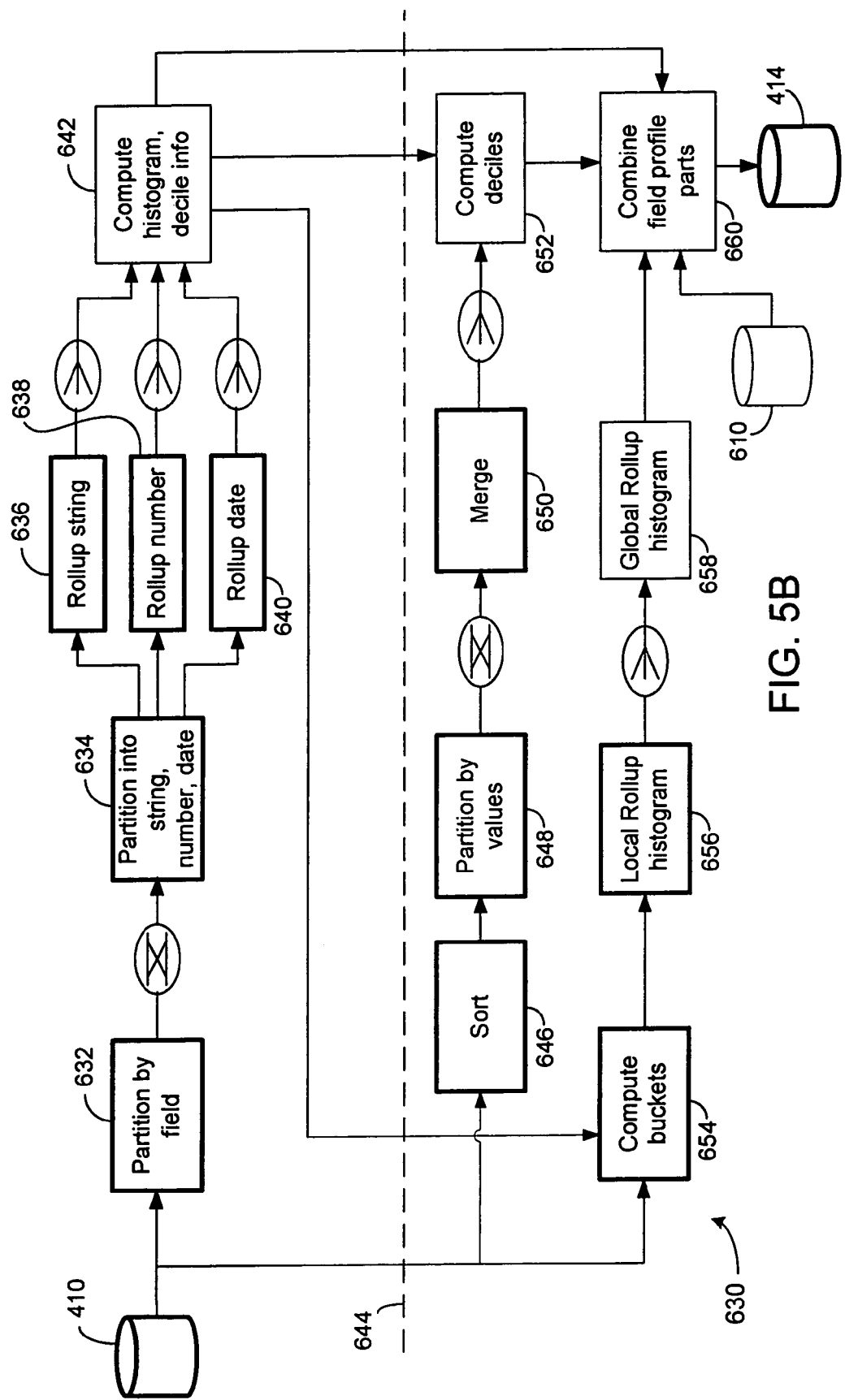

FIG. 5B is a diagram that illustrates a sub-graph 630 implementing the analyze census component 412 of the profiling graph 400. A partition by field component 632 reads a flow of census elements from the census file component 410 and re-partitions the census elements according to a hash value based on the field such that census records with the same field (but different values) are in the same partition. The partition in to string, number, date component 634 further partitions the census elements according to the type of the value in the census element. Different statistics are computed (using a rollup process) for values that are strings (in the rollup string component 636), numbers (in the rollup number component 638), or dates/datetimes (in the rollup date component 640). For example, it may be appropriate to calculate average and standard deviation for a number, but not for a string.

The results are gathered from all partitions and the compute histogram/decile info component 642 provides information useful for constructing histograms (e.g., maximum and minimum values for each field) to a compute buckets component 654, and information useful for calculating decile statistics (e.g., the number of values for each field) to a compute deciles component 652. The components of the sub-graph 630 that generate the histograms and decile statistics (below the phase break line 644) execute after the compute histogram/decile info component 642 (above the phase break line 644) finishes execution.

The sub-graph 630 constructs a list of values at decile boundaries (e.g., value larger than 10% of values, 20% of values, etc.) by: sorting the census elements by value within each partition (in the sort component 646), re-partitioning the census elements according to the sorted value (in the partition by values component 648), and merging the elements into a sorted (serial) flow into the compute deciles component 652. The compute deciles component 652 counts the sorted values for each field in groups of one tenth of the total number of values in that field to find the values at the decile boundaries.

Figure 5C:
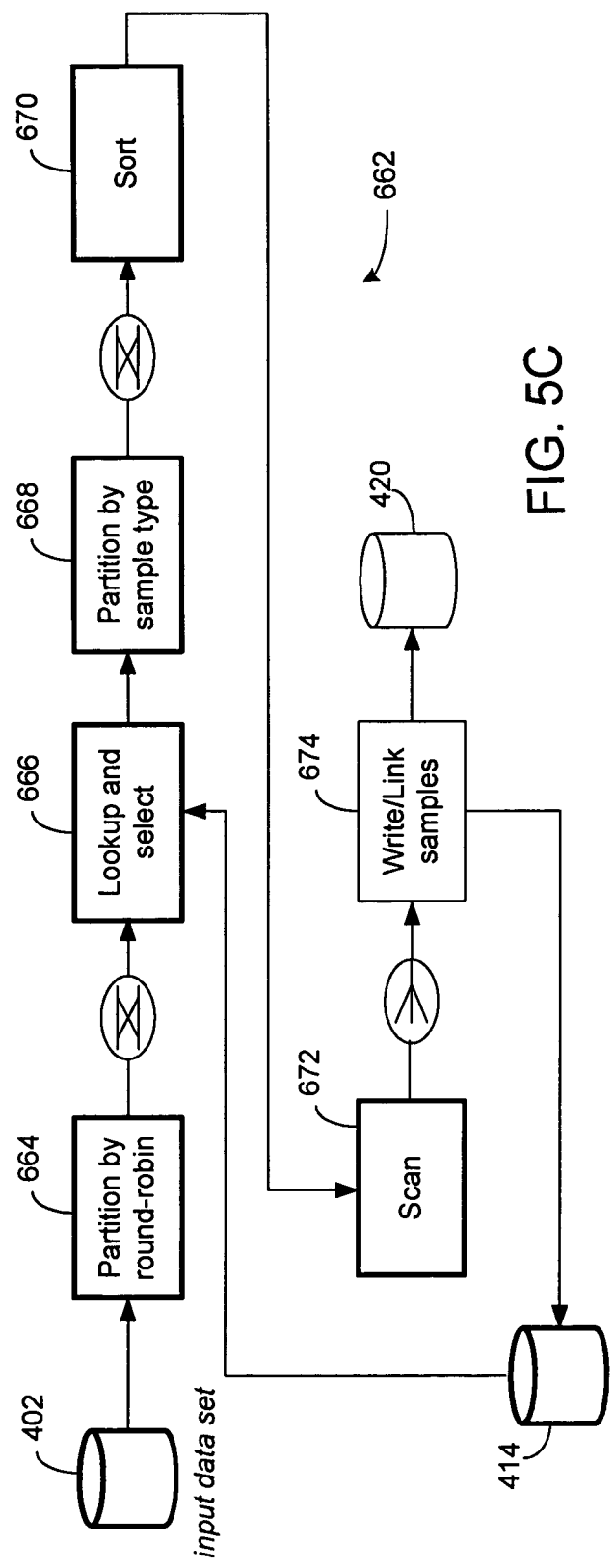

The sub-graph 630 constructs histograms for each field by: calculating the values defining each bracket of values (or "bucket"), counting values within each partition falling in the same bucket (in the local rollup histogram component 656), counting values within each bucket from all the partitions (in the global rollup histogram component 658). A combine field profile parts component 660 then collects all of the information for each field profile, including the histograms, decile statistics, and the sequence statistics from the temporary file 610, into the field profiles component 414. FIG. 5C is a diagram that illustrates a sub-graph 662 implementing the make samples component 418 of the profiling graph 400. As in the sub-graph 600, a partition by round-robin component 664 takes records from the single or multiple partitions of the input data set 402 and re-partitions the records among a number of parallel processors and/or computers in order to balance the work load among the processors and/or computers.

A lookup and select component 666 uses information from the field profiles component 414 to determine whether a record corresponds to a value shown on the user interface 116 that can be selected by a user for drill-down viewing. Each type of value shown in the user interface 116 corresponds to a different "sample type." If a value in a record corresponds to a sample type, the lookup and select component 666 computes a random selection number that determines whether the record is selected to represent a sample type.

For example, for a total of five sample records of a particular sample type, if the selection number is one of the five largest seen so far (of a particular sample type within a single partition) then the corresponding record is passed as an output along with information indicating what value(s) may correspond to drill-down viewing. With this scheme, the first five records of any sample type are automatically passed to the next component as well as any other records that have one of the five largest selection numbers seen so far.

The next component is a partition by sample type component 668 which re-partitions the records according to sample type so that the sort component 670 can sort by selection number within each sample type. The scan component 672 then selects the five records with the largest selection numbers (among all the partitions) for each sample type. The write/link sample component 674 then writes these sample records to a sample records file 420 and links the records to the corresponding values in the field profiles component 414.

The load metadata store component 416 loads the data set profile from the temporary file component 620 into a data set profile 216 object in the metadata store 112, and loads each of the field profiles from the field profiles component 414 into a field profile 222 object in the metadata store 112. The user interface 116 can then retrieve the profiling results for a data set and display it to a user 118 on a screen of produced by the user interface 116. A user can browse through the profile results to see histograms or common values for fields. A drill-down capability may be provided, for example, to view specific records that are associated with a bar in a histogram.

Figure 8C:
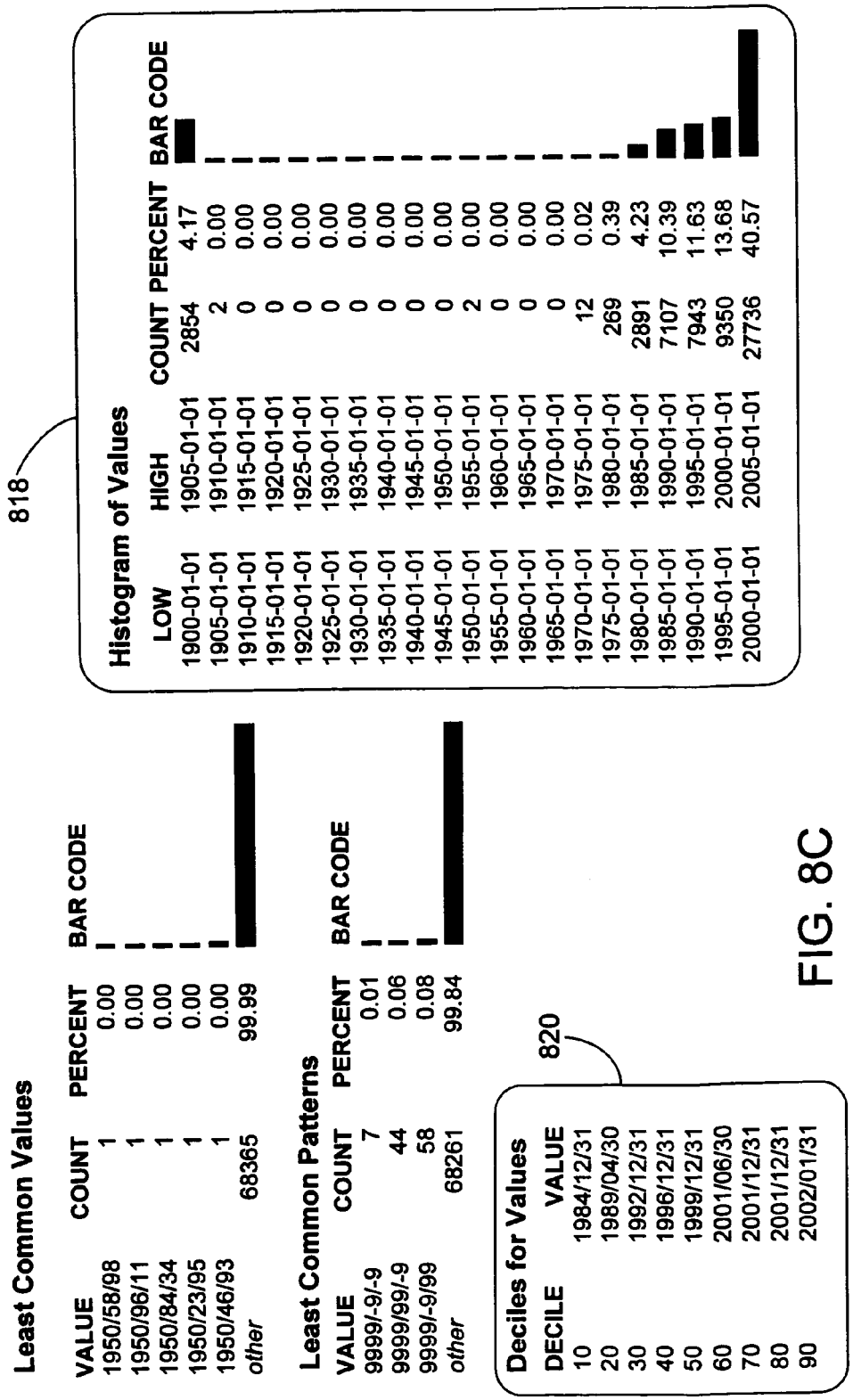

FIG. 8A-C are example user interface screen outputs showing profiling results. FIG. 8A shows results from a data set profile 216. Various totals 802 are shown for the data set as a whole, along with a summary 804 of properties associated with the profiled fields. FIGS. 8B-C show results from an exemplary field profile 222. A selection of values, such as most common values 806, and most common invalid values 808, are displayed in various forms including: the value itself as a human readable string 810, a total count of occurrences of the value 812, occurrences as a percentage of the total number of values 814, and a bar chart 816. A histogram of values 818 is displayed showing a bar for each of multiple buckets spanning the range of values, including buckets with counts of zero. The decile boundaries 820 are also displayed.

5 Examples 5.1 Data Discovery

Figure 9:
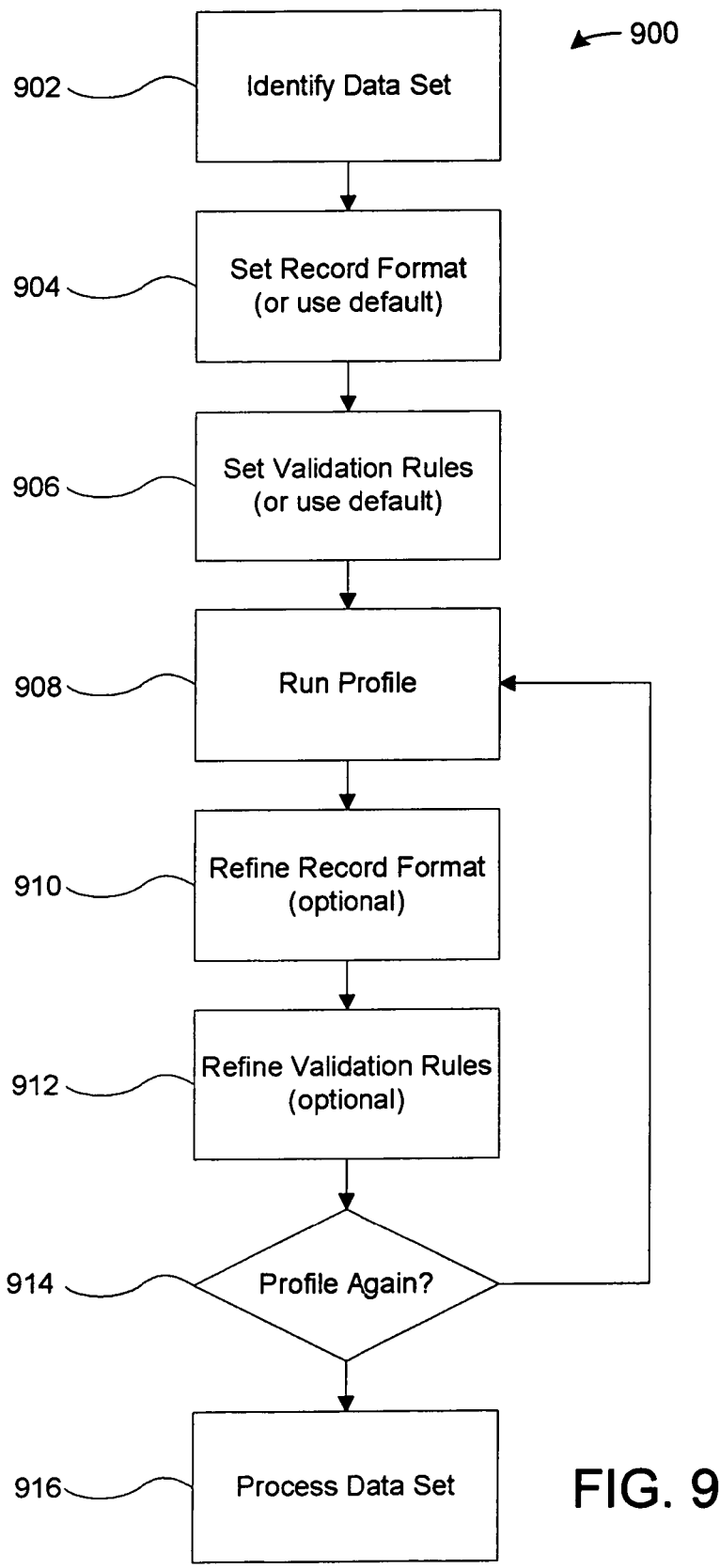
FIG. 9 is a flowchart of an exemplary profiling procedure.

FIG. 9 shows a flowchart for an example of a procedure 900 for profiling a data set to discover its contents before using it in another process. The procedure 900 can be performed automatically (e.g., by a scheduling script) or manually (e.g., by a user at a terminal). The procedure 900 first identifies 902 a data set to be profiled on one or more data systems accessible within the runtime environment. The procedure 900 may then optionally set a record format 904 and set validation rules 906 based on supplied information or existing metadata. For some types of data, such as a database table, a default record format and validation rules may be used. The procedure 900 then runs 908 a profile on the data set (or a subset of the data set). The procedure 900 can refine 910 the record format, or refine 912 the validation rules based on the results of the initial profile. If any profiling options have changed, the procedure 900 then decides 914 whether to run another profile on the data using the new options, or to process 916 the data set if enough information about the data set has been obtained from the (possibly repeated) profiling. The process would read directly from the one or more data systems using the information obtained from the profiling.

5.2 Quality Testing

Figure 10:
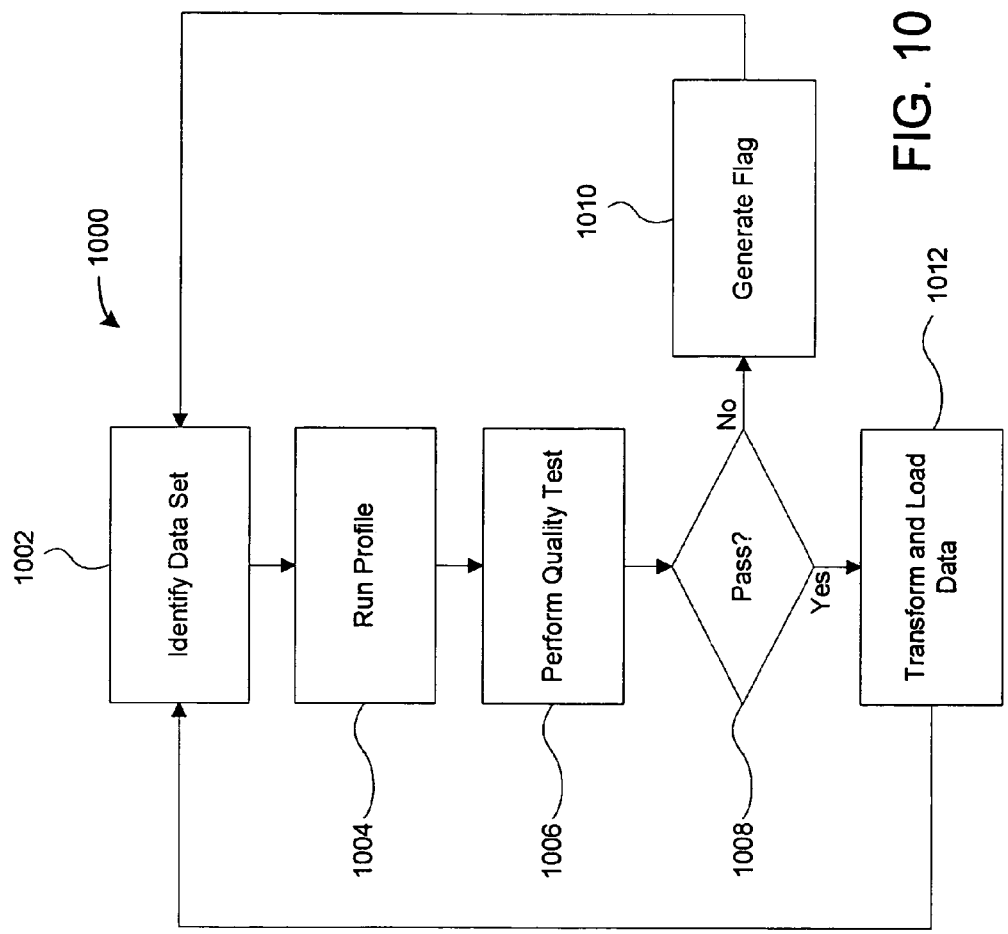
FIG. 10 is a flowchart of an exemplary profiling procedure.

FIG. 10 shows a flowchart for an example of a procedure 1000 for profiling a data set to test its quality before transforming and loading it into a data store. The procedure 1000 can be performed automatically or manually. Rules for testing the quality of a data set can come from prior knowledge of the data set, and/or from results of a profiling procedure such as procedure 900 performed on a similar data set (e.g., a data set from the same source as the data set to be tested). This procedure 1000 can be used by a business, for example, to profile a periodic (e.g., monthly) data feed sent from a business partner before importing or processing the data. This would enable the business to detect "bad" data (e.g., data with a percentage of invalid values higher than a threshold) so it doesn't "pollute" an existing data store by actions that may be difficult to undo.

The procedure 1000 first identifies 1002 a data set to be tested on one or more data systems accessible within the runtime environment. The procedure 1000 then runs 1004 a profile on the data set (or a subset of the data set) and performs 1006 a quality test based on results of the profile. For example, a percentage of occurrences of a particular common value in the data set can be compared with a percentage of occurrences of the common value in a prior data set (based on a prior profiling run), and if the percentages differ from each other by more than 10%, the quality test fails. This quality test could be applied to a value in a series of data sets that is known to occur consistently (within 10%). The procedure 1000 determines 1008 the results of the quality test, and generates 1010 a flag (e.g., a user interface prompt or an entry in a log file) upon failure. If the quality test is passed, the procedure 1000 then reads directly from the one or more data systems and transforms (possibly using information from the profile) and loads 1012 data from the data set into a data store. For example, the procedure can then repeat by identifying 1002 another data set.

5.3 Code Generation

The profiling module 100 can generate executable code such as a graph component that can be used to process a flow of records from a data set. The generated component can filter incoming records, allowing only valid records to flow out, similar to the cleaning option of the profiling graph 400. For example, the user can select a profiling option that indicates that a clean component should be generated upon completion of a profiling run. Code for implementing the component is directed to a file location (specified by the user). The generated clean component can then run in the same runtime environment as the profiling module 100 using information stored in the metadata store 112 during the profiling run.

6 Joint-Field Analysis

The profiling module 100 can optionally perform an analysis of relationships within one or more groups of fields. For example, the profiling module 100 is able to perform an analysis between two of a pair of fields, which may be in the same or in different data sets. Similarly, the profiling module is able to perform analysis on a number of pairs of fields, for example analyzing every field in one data set with every field in another data set, or every field in one data set with every other field in the same data set. An analysis of two fields in different data sets is related to the characteristics of a join operation on the two data sets on those fields, as described in more detail below.

In a first approach to joint-field analysis, a join operation is performed on two data sets (e.g., files or tables). In another approach, described below in section 6.1, after the make census component 406 generates a census file for a data set, the information in the census file can be used to perform the joint-field analysis between fields in two different profiled data sets, or between fields in two different parts of the same profiled data set (or any other data set for which a census file exists). The result of joint-field analysis includes information about potential relationships between the fields.

Three types of relationships that are discovered are: a "common domain" relationship, a "joins well" relationship, and "foreign key" relationship. A pair of fields is categorized as having one of these three types of relationships if results of the joint-field analysis meet certain criteria, as described below.

Figure 11A:
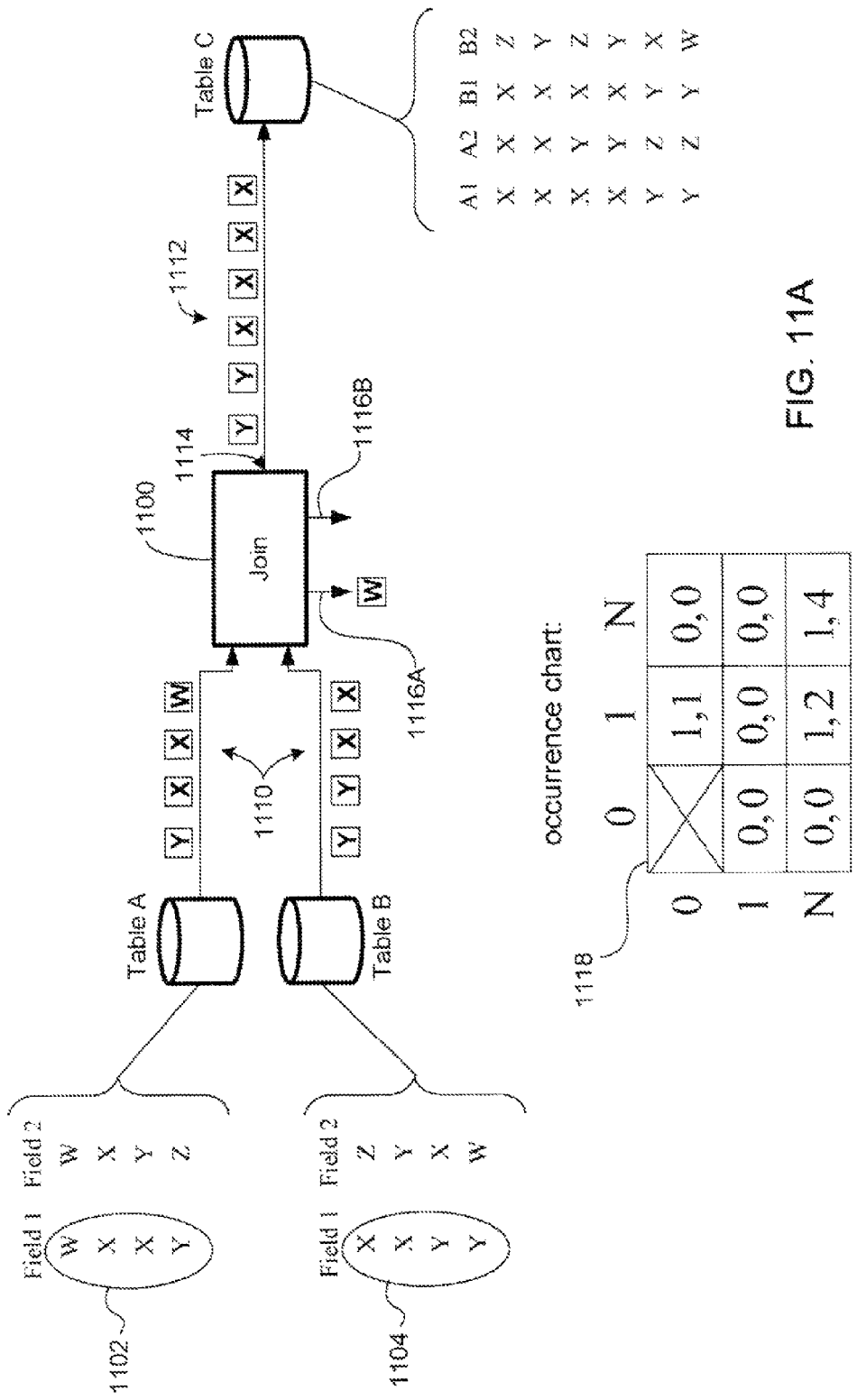
FIGS. 11A-B are two examples of a join operation performed on records from two pairs of fields.
Figure 11B:
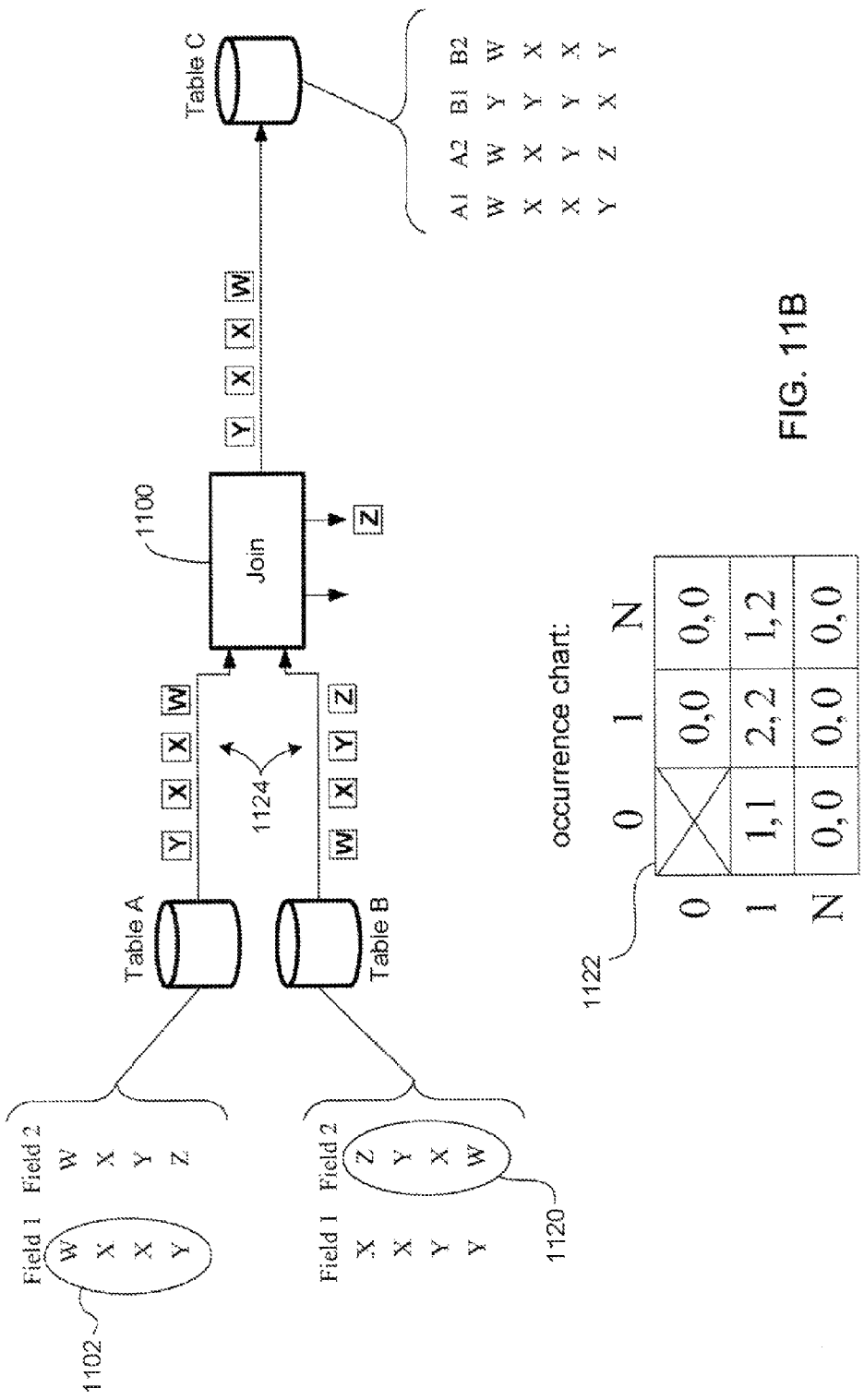

The joint-field analysis includes compiling information such as the number of records produced from a join operation performed using the two fields as key fields. FIGS. 11A-B illustrate examples of a join operation performed on records from two database tables. Each of Table A and Table B has two fields labeled "Field 1" and "Field 2," and four records.

Referring to FIG. 11A, a join component 1100 compares values from a key field of records from Table A with values from a key field of records from Table B. For Table A, the key field is Field 1, and for Table B, the key field is Field 1. So the join component 1100 compares values 1102 from Table A, Field 1 (A1) with values 1104 from Table B, Field 1 (B1). The join component 1100 receives flows of input records 1110 from the tables, and, based on the comparison of key-field values, produces a flow of joined records 1112 forming a new joined table, Table C. The join component 1100 produces a joined record that is a concatenation of the records with matching key-field values for each pair of matching key-field values in the input flows.

The number of joined records with a particular key-field value that exit on the joined output port 1114 is the Cartesian product of the number of records with that key-field value in each of the inputs, respectively. In the illustrated example, the input flows of records 1110 are shown labeled by the value of their respective key fields, and the output flow of joined records 1112 are shown labeled by the matched values. Since two "X" values appear in each of the two input flows, there are four "X" values in the output flow. Records in one input flow having a key-field value that does not match with any record in the other input flow exit on "rejected" output ports 1116A and 1116B, for the Table A and Table B input flows, respectively. In the illustrated example, a "W" value appears on the rejected output port 1116A.

The profiling module 100 compiles statistics of joined and rejected values for categorizing the relationship between two fields. The statistics are summarized in an occurrence chart 1118 that categorizes occurrences of values in the two fields. An "occurrence number" represents the number of times a value occurs in a field. The columns of the chart correspond to occurrence numbers 0, 1, and N (where N>1) for the first field (from Table A in this example), and the rows of the chart correspond to occurrence numbers 0, 1, and N (where N>1) for the second field (from Table B in this example). The boxes in the chart contain counts associated with the corresponding pattern of occurrence: 'column occurrence number'×'row occurrence number'. Each box contains two counts: the number of distinct values that have that pattern of occurrence, and the total number of individual joined records for those values. In some cases the values occur in both fields (i.e., having a pattern of occurrence: 1×1, 1×N, N×1, or N×N), and in other cases the values occur in only one field (i.e., having a pattern of occurrence: 1×0, 0×1, N×0, or 0×N). The counts are separated by a comma.

The occurrence chart 1118 contains counts corresponding to the joined records 1112 and the rejected record on port 1116A. The value "W" on the rejected output port 1116A corresponds to the "1, 1" counts in the box for the 1×0 pattern of occurrence indicating a single value, and a single record, respectively. The value "X" corresponds to the "1, 4" counts in the box for the N×N pattern of occurrence since the value "X" occurs twice in each input flow, for a total of four joined records. The value "Y" corresponds to the "1, 2" counts in the box for the 1×N pattern of occurrence since the value "Y" occurs once in the first input flow and twice in the second input flow, for a total of two joined records.

FIG. 11B illustrates an example similar to the example of FIG. 11A, but with a different pair of key fields. For Table A, the key field is Field 1, and for Table B, the key field is Field 2. So the join component compares values 1102 from Table A, Field 1 (A1) with values 1120 from Table B, Field 2 (B2). This example has an occurrence chart 1122 with counts corresponding to the flows of input records 1124 for these fields. Similar to the example in FIG. 11A, there is a single rejected value "Z" that corresponds to the "1, 1" counts in the box for the 0×1 pattern of occurrence. However, in this example, there are two values, "W" and "Y," that both have the 1×1 pattern of occurrence, corresponding to the "2, 2" counts in the fox for the 1×1 pattern of occurrence since there are two values, and two joined records. The value "X" corresponds to the "1, 2" counts in the box for the N×1 pattern of occurrence, indicating a single value and 2 joined records.

Various totals are calculated from the numbers in the occurrence chart. Some of these totals include the total number of distinct key-field values occurring in both Table A and Table B, the total number of distinct key-field values occurring in Table A, the total number of distinct key-field values occurring in Table B, and the total number unique values (i.e., values occurring only in a single record of the key field) in each table. Some statistics based on these totals are used to determine whether a pair of fields has one of the three types of relationships mentioned above. The statistics include the percentages of total records in a field that have distinct or unique values, percentages of total records having a particular pattern of occurrence, and the "relative value overlap" for each field. The relative value overlap is the percentage of distinct values occurring one field that also occur in the other. The criteria for determining whether a pair of fields has one of the three types of relationships (which are not necessarily mutually exclusive) are:

foreign key relationship—a first one of the fields has a high relative value overlap (e.g., >99%) and the second field has a high percentage (e.g., >99%) of unique values. The second field is potentially a primary key and the second field is potentially a foreign key of the primary key.

joins well relationship—at least one of the fields has a small percentage (e.g., <10%) of rejected records, and the percentage of individual joined records having a pattern of occurrence of N×N is small (e.g., <1%).

common domain relationship—at least one of the fields has a high relative value overlap (e.g., >95%).

If a pair of fields has both a foreign key and a joins well or common domain relationship, the foreign key relationship is reported. If a pair of fields has both a joins well relationship and a common domain relationship, but not a foreign key relationship, the joins well relationship is reported.

6.1 Census Join

Referring to FIG. 12A, in an alternative to actually performing a join operation on the tables, a census join component 1200 analyzes fields from Table A and Table B and compiles the statistics for an occurrence chart by performing a "census join" operation from census data for the tables. Each census record has a field/value pair and a count of the occurrences of the value in the field. Since each census record has a unique field/value pair, for a given key field, the values in an input flow of the census join component 1200 are unique. The example of FIG. 12A corresponds to the join operation on the pair of key fields A1, B1 (illustrated in FIG. 11A). By comparing census records corresponding to the key fields in the join operation, with filter 1202 selecting "Field 1" (A1) and filter 1204 selecting "Field 1" (B1), the census join component 1200 potentially makes a much smaller number of comparisons than a join component 1100 that compares key fields of individual records from Table A and Table B. The example of FIG. 12B corresponds to the join operation on the pair of key fields A1, B2 (illustrated in FIG. 11B), with filter 1206 selecting "Field 1" (A1) and filter 1208 selecting "Field 2" (B2). The selected census records 1210-1218 are shown labeled by the value for their respective field in the field/value pair, and the count of occurrences for that value.

If the census join component 1200 finds a match between the values in two input census records 1210-1218, the output record contains the matched value, the corresponding pattern of occurrence based on the two counts, and a total number of records that would be generated in a join operation on the pair of key fields (which is just the product of the two counts). If no match is found for a value, the value is also output with a corresponding pattern of occurrence and a total number of records (which is the single count in the single input record). This information within the output records of the census join component 1200 is sufficient to compile all of the counts in an occurrence chart for the join operation.

In the example of FIG. 12A, the value "W" appears at the output with an occurrence pattern of 1×0 and a total of 1, the value "X" appears at the output with an occurrence pattern of N×N and a total of 4, and the value "Y" appears at the output with an occurrence pattern of 1×N and a total of 2. This information corresponds to the information in the occurrence chart 1118 of FIG. 11A. In the example of FIG. 12B, the value "W" appears at the output with an occurrence pattern of 1×1 and a total of 1, the value "X" appears at the output with an occurrence pattern of N×1 and a total of 2, the value "Y" appears at the output with an occurrence pattern of 1×1 and a value of 1, and the value "Z" appears at the output with an occurrence pattern of O×1 and a value of 1. This information corresponds to the information in the occurrence chart 1122 of FIG. 11B.

6.2 Extended Records

A joint-field analysis for multiple field pairs in a single census join operation includes generating "extended records" based on the census records. In the example illustrated in FIG. 13, the census join component 1200 compares records for a joint-field analysis of both pairs of key fields A1, B1 and A1, B2, combining the joint-field analysis illustrated in FIGS. 12A-B. An extended record is generated from a census records by concatenating a unique identifier for the pair of key fields that are being joined with the value in the census record, and keeping the same count of occurrences as the census record.

If a joint-field analysis includes results of a field being joined with multiple other fields, then multiple extended records are generated for each value in the that field. For example, the census record 1210 corresponds to two extended records 1301-1302, with the value "W" concatenated with an identifier "A1B1" and "A1B2," respectively. The census join component 1200 handles the extended record 1301 just as it would handle a census record with the value "WA1B1." Likewise, the census record 1211 corresponds to the two extended records 1303-1304, and census record 1212 corresponds to the two extended records 1305-1306.

Figure 13:
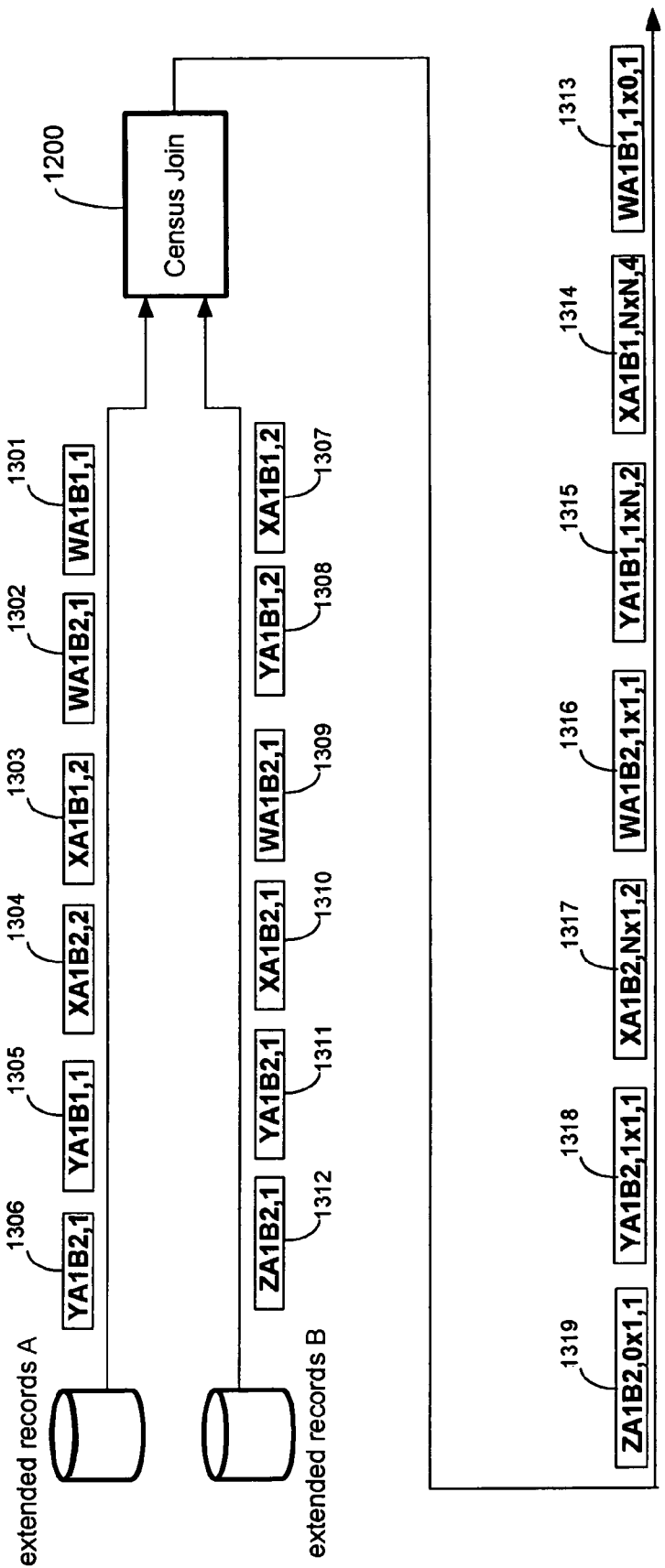
FIG. 13 is an example of extended records used to perform a single census join operation on two pairs of fields.

In the joint-field analysis of FIG. 13, the field B1 is only joined with one other field (A1), so each census record 1213-1214 corresponds to a single extended record 1307-1308, respectively. Likewise, the field B2 is joined with one other field (A1), so each census record 1215-1218 corresponds to a single extended record 1309-1312. Each extended record includes a value based on the original value concatenated with a unique field identifier.

Figure 14:
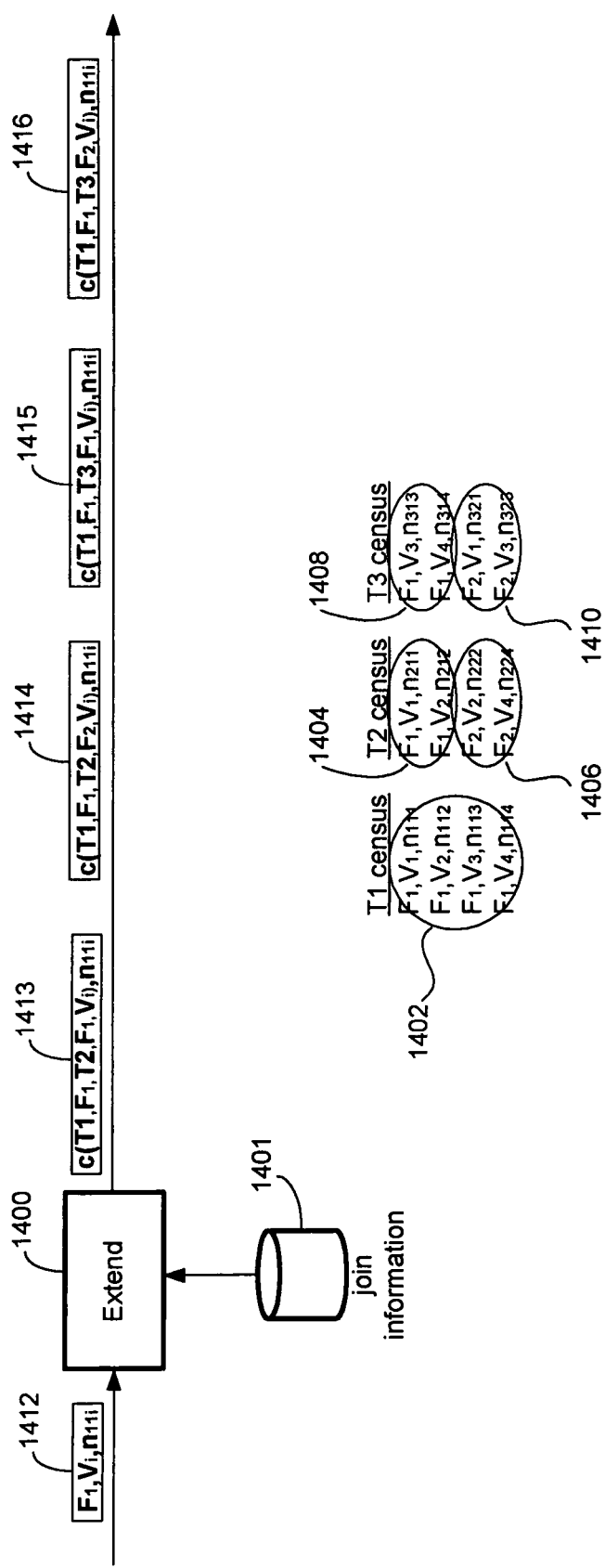
FIG. 14 is an extend component used to generate extended records.

Referring to FIG. 14, an extend component 1400 processes input census records to generate extended records, based on join information 1401 indicating which fields are being joined with which other fields in the joint-field analysis. In this example, the join information 1401 indicates that a field $F_1$, from census data for table T1 (having four census records 1402) is being joined with four other fields: field $F_1$, from census data for table T2 (having two census records 1404), field $F_2$ from census data for table T2 (having two census records 1406), field $F_1$, from census data for table T3 (having two census records 1408), and field $F_2$ from census data for table T3 (having two census records 1410). A census record 1412 flowing into the extend component 1400 represents one of the four census records 1402 from census data for table T1 having field $F_1$, and value $V_i$ where i=1, 2, 3, or 4. The extend component 1400 generates four extended records 1413-1416 for the input census record 1412.

The census join component 1200 uses unique identifiers for fields including fields in different tables having the same name. The extended record 1413 has a value $c(T1,F_1,T2,F_1,V_i)$ that is a concatenation of the original value $V_i$ with identifiers for the fields being joined as well as for the table (or file or other data source) from which the census data for the field was generated. Including the identifier for the table enables fields having the same name to be distinguished. The extended record 1415 that has a value $c(T1,F_1,T3,F_1,V_i)$ that can be distinguished from the value $c(T1,F_1,T2,F_1,V_1)$ of the extended record 1413, where both tables T2 and T3 have the same field name $F_1$. Alternatively, a unique number can be assigned to each field and used in place of the field name.

6.3 Joint-Field Analysis Graphs

Figure 15A:
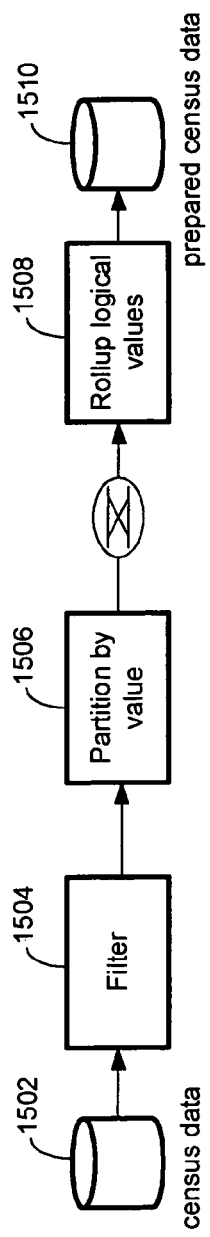
FIGS. 15A-C are graphs used to perform joint-field analysis.
Figure 15B:
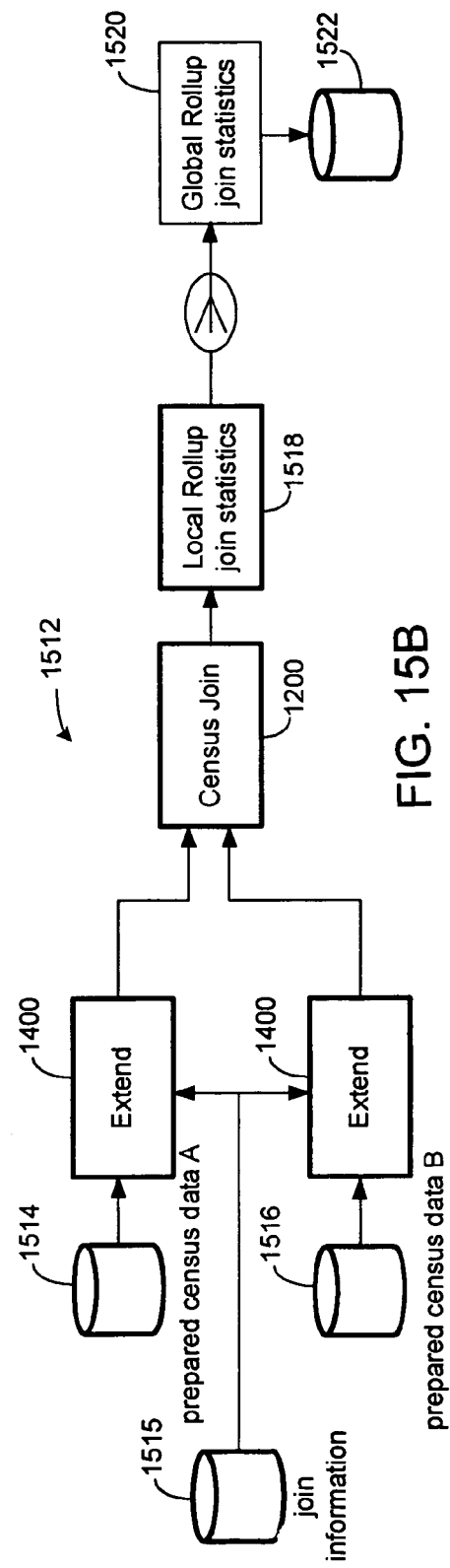

FIGS. 15A-B show graphs used by the profiling module 100 to perform an optional joint-field analysis of selected fields in sources (e.g., tables or files) within data sources 30. A user 118 selects options for profiling and for joint-field analysis, including the option of performing profiling without joint-field analysis. The user 118 selects field pairs for joint-field analysis including two specific fields paired with each other, one field paired with every other field, or every field paired with every other field. The user 118 selects an option allow pairing of fields within the same table or file, or to allow pairing of fields only from different tables or files. These options are stored in the metadata store 112.

Referring to FIG. 15A, for each source (e.g., a table or file) of fields specified in the joint-field analysis options, the graph 1500 generates a file with prepared census data 1510 for those specified fields. The graph 1500 executes once for each such source included in the joint-field analysis. A filter 1504 receives records from census data 1502 generated by the make census component 406 and prepares the records for joint-field analysis. The filter 1504 discards records for fields that are not included in the analysis (as determined by user options stored in the metadata store 112). The filter 1504 also discards invalid values, null values, and other values not included in a meaningful analysis of the content of data sources (e.g., known data flags).

The values in the census data 1502 have been canonicalized by a canonicalize component 616 within the make census component 406. However, these canonicalized values may have portions that should not be used in a logical comparison of values (e.g., strings with leading or trailing spaces or numbers with leading or trailing zeros). The user 118 can select an option for these values to be compared "literally" or "logically." If the user 118 selects "literal" comparison, then the values in the census records are left in the canonicalized form. If the user 118 selects "logical" comparison, then the filter 1504 converts values in the census records according to rules such as stripping leading and trailing spaces, and stripping leading and trailing zeros for numbers.

The partition by value component 1506 re-partitions the records based on the value in the census record. Any census records with the same value are put into the same partition. This allows the joint-field analysis to be run in parallel across any number partition. Since the census join component 1200 only produces an output record for input records with matching values, census records (or any extended records generated from them) in different partitions do not need to be compared with one another.

A rollup logical values component 1508 combines any census records that have matching field/value pairs due to the conversion performed by the filter 1504. The combined record has a count of occurrences that is the sum of the count for all of the combined records. For example, if a census record with a field, value, count of "amount, 01.00, 5" is converted to "amount, 1, 5" and a census record with a field, value, count of "amount, 1.0, 3" is converted to "amount, 1, 3," then the rollup logical values component 1508 combines these two converted records to a single record with a field, value, count of "amount, 1, 8."

Referring to FIG. 15B, for each pair of sources, source A and source B, having one or more fields to be compared, as specified in the joint-field analysis options, the graph 1512 executes using the prepared census data A 1514 and prepared census data B 1516, each prepared by graph 1500. Two extend components 1400 receive records from these sets of prepared census data, along with join information 1515 specifying the specific fields in source A to be compared with specific fields in source B. Extended records flow into a census join component 1200 that generates records containing values, patterns of occurrence, and counts for occurrence charts for the fields being compared. A local rollup join statistics component 1518 compiles the information in these records within each partition. The records in the various partitions are then gathered and complied by a global rollup join statistics component 1520 that outputs a file 1522 all of the joint-field analysis statistics for the fields in all of the pairs of sources that are analyzed. The results of the joint-field analysis including which of the three types of relationship potentially exists between various fields is loaded into the metadata store 112 for presentation to the user 118. For example, the user 118 can select a link on the user interface 116 for a pair of fields with a potential relationship and view a page on the user interface 116 with detailed analysis results including counts from an occurrence chart for the pair of fields.

Figure 15C:
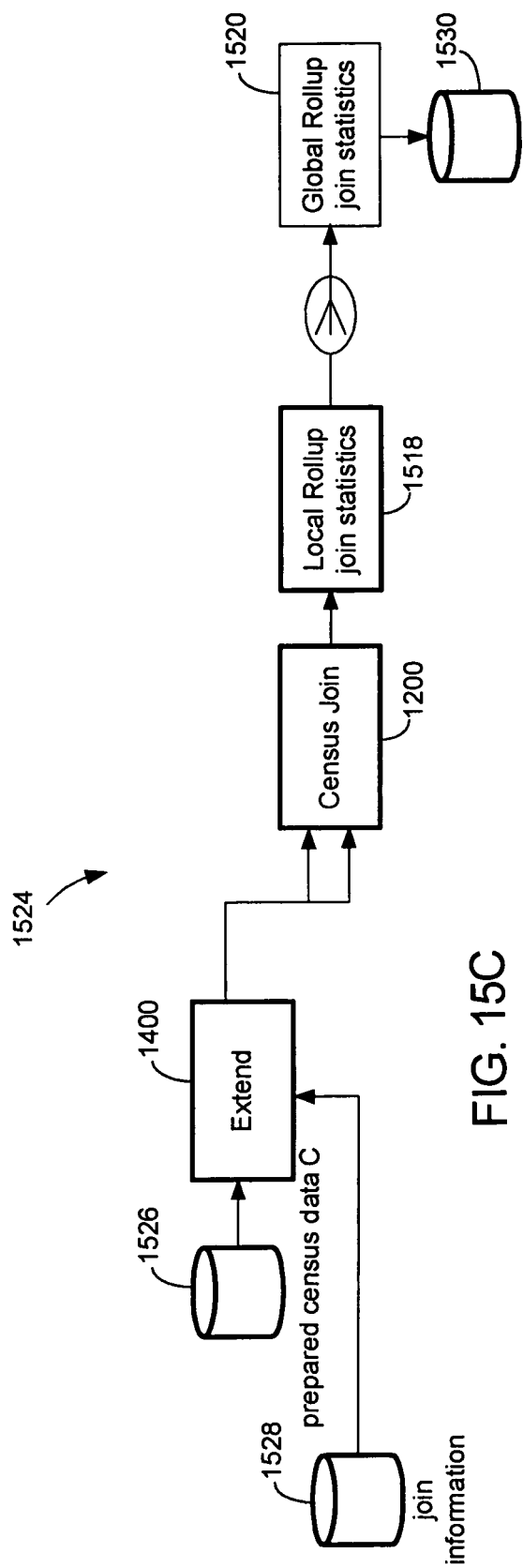

Referring to FIG. 15C, when a joint-field analysis is performed for two fields within the same source (source C), the graph 1524 executes using the prepared census data C 1526 prepared by graph 1500. A single extend component 1400 receives records from the set of prepared census data C 1526, along with join information 1528 specifying the specific fields in source C to be compared. Extended records flow into both ports of a census join component 1200 that generates records containing values, patterns of occurrence, and counts for occurrence charts for the fields being compared.

In the case of joint-field analysis options indicating that every field in source C is to be compared with every other field in source C (having four fields: F1, F2, F3, F4), one approach is for the join information 1528 to specify twelve pairs of fields (F1-F2, F1-F3, F1-F4, F2-F1, F2-F3, F2-F4, F3-F1, F3-F2, F3-F4, F4-F1, F4-F2, F4-F3). However, since the same operations are performed for the pairs F1-F3 and F3-F1, some operations are repeated. Accordingly, another approach is for the join information to specify only the six unique pairs F1-F2, F1-F3, F1-F4, F2-F3, F2-F4, F3-F4. In this case, the results in the output file 1530 are augmented to include results for the other six field pairs by reversing the order of the fields in the analysis results for the six pairs that were analyzed.

7 Functional Dependency Analysis

Another type of analysis that the profiling module 100 is able to perform is a test for a functional relationship between values of fields. The fields tested can be from a single table that has a set of fields or from a "virtual table" that includes fields from multiple sources that are related (e.g., through a join operation on the fields using a common key field, as described in more detail in section 7.3). One type of functional relationship between a pair of fields is "functional dependency" where the value associated with one field of a record can be uniquely determined by the value associated with another field of the record. For example, if a database has a State field and a Zip Code field, the value of the Zip Code field (e.g., 90019) determines the value of the State field (e.g., CA). Each value of the Zip Code field maps onto a unique value of the State field (i.e., a "many-to-one" mapping). A functional dependency relationship can also exist among a subset of fields where the value associated with one field of a record can be uniquely determined by the values associated with other fields of the record. For example, the value of the Zip Code field can be uniquely determined by the values of a City field and a Street field.

The functional dependency can also be an "approximate functional dependency" where some but not necessarily all of the values associated with one field map onto a unique value of another field, with a percentage of exceptions that do not map onto the unique value. For example, some records may have an unknown Zip Code that is indicated by a special value 00000. In this case, the value 00000 of the Zip Code field may map onto more than one value of the State field (e.g., CA, FL, and TX). Exceptions can also occur due to records with incorrect values, or other errors. If the percentage of exceptions is smaller than a pre-determined (e.g., as entered by a user) threshold, then a field may still be determined to be functionally dependent on another field.

Figure 16:
FIG. 16 is an example table with fields having a functional dependency relationship.

Referring to FIG. 16, an example table 1600 with records (rows) and fields (columns) to be tested for functional dependency or approximate functional dependency is shown. A Last Name field has twelve values corresponding to twelve records (rows 1-12). Ten of the values are unique, and two of the records have the same repeated value name_g. A Citizenship field has two unique values: US occurring eleven times and CANADA occurring once. A Zip Code field has various values each corresponding to one of three values CA, FL, and TX for a State field. Each value of Zip Code uniquely determines a value of State, except for the Zip Code value 00000 that corresponds to FL in one record (row 10) and to TX in another record (row 12).

7.1 Functional Dependency Analysis Graph

Figure 17:
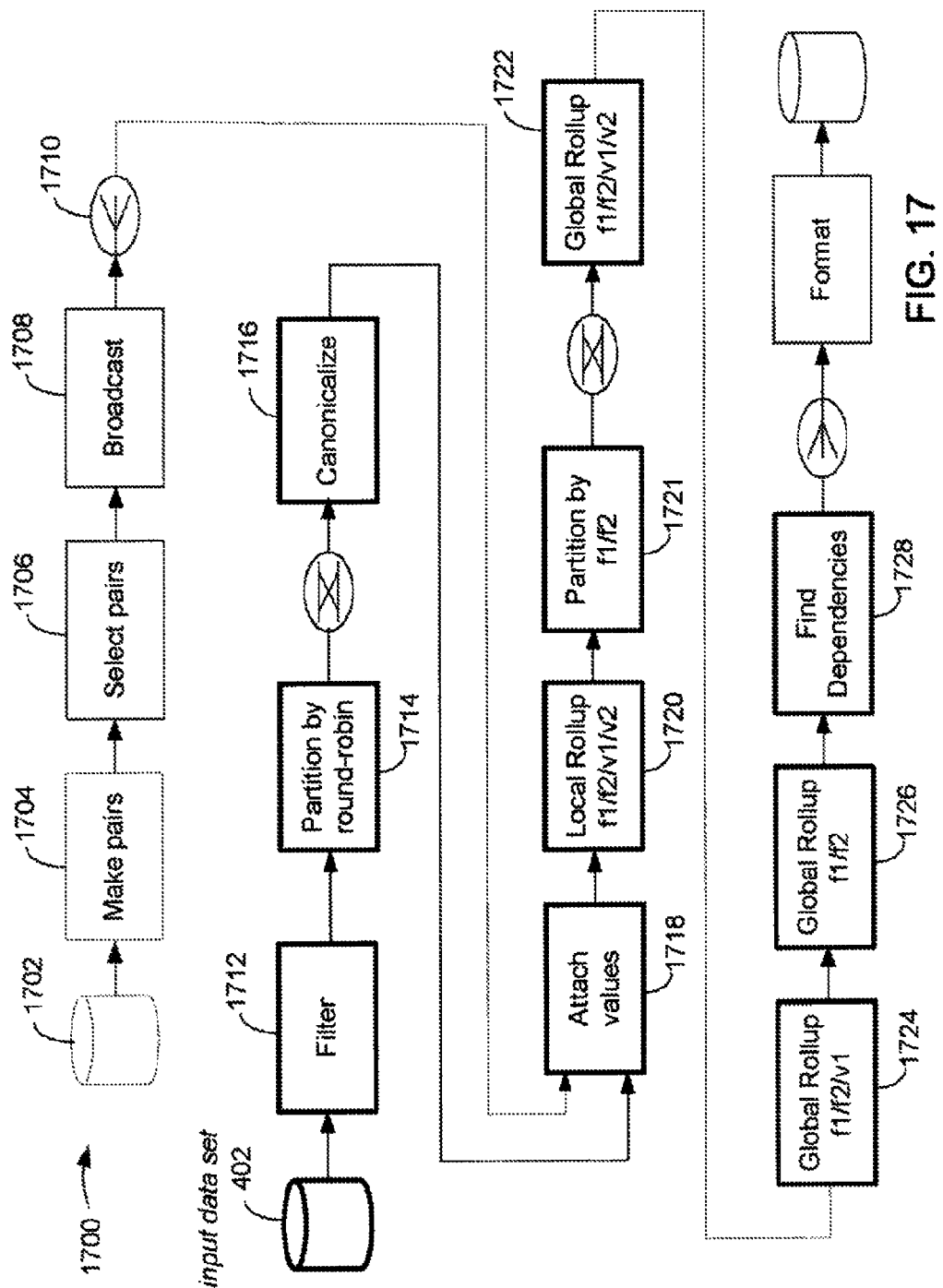
FIG. 17 is a graph used to perform functional dependency analysis.

FIG. 17 shows an example of a graph 1700 used by the profiling module 100 to perform an optional functional dependency analysis of selected fields in one or more sources (e.g., in a single table or file, or in multiple tables and/or files as described in section 7.3) within data sources 30. A user 118 selects options for profiling and for functional dependency analysis, including the option of performing profiling without functional dependency analysis. The user 118 may choose which pair or pairs of fields are tested for a functional relationship. The user 118 selects particular fields of a data source (e.g., a table or file), and chooses, for example, "all to selected" or "selected to selected" to determine which pairs of fields are tested or chooses "all to all" to test all pairs of fields in the data source. The user may also select a threshold for determining a degree of functional dependency before deciding that a field is or is not functionally dependent on another field. For example, the user may select a threshold for determining how many exceptions to allow (as a percentage of records). These options are stored in the metadata store 112.

For each pair of fields (f1, f2) that is to be analyzed, the graph 1700 determines whether a functional dependency relationship exists, and if so, classifies the relationship between field f1 and field f2 as: "f1 determines f2", "f2 determines f1", "one-to-one" (a one-to-one mapping exists between f1 and f2), or "identical" (f1 has identically the same value as f2 in each of the records). The graph 1700 reads field information 1702 stored by the profiling module 100 to determine unique identifiers for fields to be analyzed. A make pairs component 1704 generates a flow of field pairs (f1, f2) using a pair of unique identifiers for each of the pairs of fields to be tested. The pair (f1, f2) is an ordered pair since the relationship between f1 and f2 is not necessarily symmetric. So both pairs (f1, f2) and (f2, f1) are included in the flow.

A select pairs component 1706 limits the field pairs that flow to the rest of the graph 1700 by selecting the field pairs chosen for analysis by the user. The select pairs component 1706 further limits the pairs that flow to the rest of the graph based on a variety of optimizations. For example, a field is not paired with itself since such a pair is classified as "identical" by definition. So the pairs (f1, f1), (f2, f2), . . . etc. are not included in the flow. Other optimizations may remove one or more pairs of fields from the flow, as described in more detail below in section 7.2.

A broadcast component 1708 broadcasts the serial flow of field pairs to each of the partitions of a (potentially parallel) attach values component 1718, as represented by a broadcast link symbol 1710. Each partition of the attach values component 1718 takes as input a flow of field pairs (e.g., (LastName, Citizenship), (Zip, State), . . . etc.) and a flow of field/value pairs (e.g., (LastName, name_a), (LastName, name_b), (LastName, name_c), . . . , (Citizenship, Canada), (Citizenship, US), (Citizenship, US), . . . etc.).

To obtain the flow of field/value pairs, a filter component 1712 extracts records from the input data set 402, and optionally removes a portion of the records based on a filter expression. The records flowing out of the filter component 1712 flow into a partition by round-robin component 1714. The partition by round-robin component 1714 takes records from the partitions of the input data set 402 and re-partitions the records among a number of parallel processors and/or computers in order to balance the work load among the processors and/or computers. The canonicalize component 1716 (similar to the canonicalize component 616 described above) takes in a flow of records and sends out a flow of field/value pair representing values for each field in an input record. As described above, each value is converted into a canonical human readable string representation.

The attach values component 1718 performs a series of join operations to generate a flow of f1/f2/v1/v2 quadruples where f1 and f2 correspond to one of the field pairs received at the input, and v1 and v2 corresponds to values that are paired with those fields in a record. In the example of table 1600, when the Last Name field corresponds to f1 and the Citizenship field corresponds to f2, the attach value component 1718 generates a flow of twelve f1/f2/v1/v2 quadruples including: (LastName/Citizenship/name_a/Canada), (LastName/Citizenship/name_b/US), (LastName/Citizenship/name_k/US), (LastName/Citizenship/name_g/US). The attach values component 1718 generates similar series of f1/f2/v1/v2 quadruples for (Zip, State) and any other pairs of fields that are analyzed.

The attach values component 1718 outputs the flow of f1/f2/v1/v2 quadruples into a "local rollup f1/f2/v1/v2" component 1720 which (for each partition) accumulates multiple quadruples with the same fields and values f1, f2, v1, v2 and represents them as a single quadruple with a count of the number of occurrences of the quadruple in the input flow. The output flow of the "local rollup f1/f2/v1/v2" component 1720 consists of quadruples with counts (or "accumulated quadruples").

The accumulation that occurs in the "local rollup f1/f2/v1/v2" component 1720 is within each partition. So it is possible that some quadruples with the same values of f1, f2, v1, v2 are not accumulated by this component 1720. A "partition by f1/f2" component 1721 repartitions the flow of accumulated quadruples such that quadruples with the same fields f1, f2 are in the same partition. A "global rollup f1/f2/v1/v2" component 1722 further accumulates the repartitioned quadruples. The output flow of the "global rollup f1/f2/v1/v2" component 1722 consists of unique accumulated quadruples. In the example of table 1600, when the Zip field corresponds to f1 and the State field corresponds to f2, the combined effect of the components 1720-1722 generates the following six accumulated quadruples: (Zip/State/90019/CA, 4), (Zip/State/90212/CA, 2), (Zip/State/33102/FL, 3), (Zip/State/00000/FL, 1), (Zip/State/77010/TX, 1), (Zip/State/00000/TX, 1). When the State field corresponds to f1 and the Zip field corresponds to f2, the combined effect of the components 1720-1722 generates the following six accumulated quadruples: (State/Zip/CA/90019, 4), (State/Zip/CA/90212, 2), (State/Zip/FL/33102, 3), (State/Zip/FL/00000, 1), (State/Zip/TX/77010, 1), (State/Zip/TX/00000, 1).

To prepare to test for a functional dependency relationship between a pair of fields, a "global rollup f1/f2/v1" component 1724 combines accumulated quadruples that have both fields f1, f2 and the first value v1 in common. In producing an output element, this component 1724 examines all values of v2 that go with a value of v1 and selects the most frequent v2 to associate with that v1 value. The number of quadruples sharing the most frequent v2 are counted as "good" and the rest of the quadruples are counted as "exceptions." If there is only one value of v2 for a given v1, then the accumulated quadruples having that value are good and there are no exceptions. If there is a tie for the most frequent value of v2, then the first value is selected. In the example of table 1600, when the Zip field corresponds to f1 and the State field corresponds to f2, the component 1724 generates: (Zip/State/90019/CA, 4 good), (Zip/State/90212/CA, 2 good), (Zip/State/33102/FL, 3 good), (Zip/State/00000/FL, 1 good, 1 exception), (Zip/State/77010/TX, 1 good). When the State field corresponds to f1 and the Zip field corresponds to f2, the component 1724 generates: (State/Zip/CA/90019, 4 good, 2 exceptions), (State/Zip/FL/33102, 3 good, 1 exception), (State/Zip/TX/77010, 1 good, 1 exception).

A "global rollup f1/f2" component 1726 adds the good counts and the exceptions for each unique pair of fields f1, f2. In the example of table 1600, when the Zip field corresponds to f1 and the State field corresponds to f2, the component 1726 generates: (Zip/State, 11 good, 1 exception). When the State field corresponds to f1 and the Zip field corresponds to f2, the component 1726 generates: (State/Zip, 8 good, 4 exceptions).

A find dependencies component 1728 uses the accumulated co-occurrence statistics (i.e., numbers of good and exceptional records) from the "global rollup f1/f2" component 1726 to determine whether a pair of fields has the relationship "f1 determines f2." If the percentage of exceptions (give by: number of exceptions/(number of good+number of exceptions)) is less than the selected threshold for determining how many exceptions to allow, then the pair of fields has the relationship "f1 determines f2." In the example of table 1600, for a threshold of 10%, when the Zip field corresponds to f1 and the State field corresponds to f2, the percentage of exceptions is 8.3% and the value of the Zip field determines the value of the State field. When the State field corresponds to f1 and the Zip field corresponds to f2, the percentage of exceptions is 33%, so the relationship between the Zip and State fields is not a one-to-one mapping. Alternatively, a value based on a mathematical property of the accumulated values can be used to determine whether field f1 determines field f2 (e.g., the conditional entropy of the value of field f2 given the value of field f1; or a standard deviation of a numerical value).

7.2 Field Pair Selection Optimizations

A variety of optimizations can be applied to increase the speed of functional dependency analysis, for example, by filtering pairs of fields at the select pairs component 1706, or by filtering records at the filter component 1712. Some optimizations are based on the recognition that some functional dependency relationships that are discovered by the graph 1700 described above may not as meaningful to a user as others. For a given pair of fields, some of these cases can be detected and filtered out by the select pairs component 1706 based on statistics provided by the profiling module 100, saving computing resources. For example, if all of the values of a first field f1 are unique (each value occurring in only a single record), then the value of that field f1 determines the value of the second field f2 regardless of the values occurring in the field f2.

The graph 1700 can use census data obtained during profiling to compute a probability that a first field f1 determines a second field f2 based on a random (e.g., a uniform probability distribution) pairing of values in the fields. If there is a high probability (e.g., >10%) that a random pairing would result in a functional dependency, then the field pair is filtered out by the select pairs component 1706. In the example of table 1600, when the LastName field corresponds to f1 and the Citizenship field corresponds to f2, every random pairing of LastName with Citizenship results in all quadruples being counted as good except when one of the name_g values (in row 7 or row 12) is randomly paired with the value Canada. Even when this random pairing occurs (with a probability of 16.7% (2 out of 12 pairings)), the percentage of exceptions is only 8.3%, which is under the threshold. So in this example, the select pairs component 1706 filters the pair (LastName, Citizenship).

Another optimization is based on histograms of values calculated by the profiling module 100 from census data. The select pairs component 1706 filters pairs when it is not possible for field f1 to determine field f2. In the example of table 1600, the most frequent value of State occurs 6 times and the most frequent value of a Zip occurs only 4 times. So it is not possible for the value of State to determine the value of Zip since there would be at least 2 out of 6 exceptions for at least half of the values, resulting in at least a 16.7% exception percentage. So in this example, the select pairs component 1706 filters the pair (State, Zip).

For a large number of records, the graph 1700 can increase the speed of testing for functional dependency by processing a small sample of the records first to eliminate field pairs that are highly likely not functionally related before processing all of the records. The graph 1700 can use the filter component 1712 to select a portion of the records. Alternatively, the graph 1700 can use the canonicalize component 1716 to select a portion of the field/value pairs.

The records or field/value pairs can be sampled based on a variety of criteria. The graph 1700 can sample based on statistics provided by the profiling module 100. For example, the graph 1700 can test for functional dependency based on the most frequent value of first field f1 (the "determiner"). If the resulting number of exceptions are higher than the threshold, then there is no need to process the rest of values of the determiner. The graph 1700 can also test for functional dependency based on a random sample of determiner values. If a sufficient number of quadruples count as good among the sampled values, then the probability of finding a substantial number exceptions among the other values is assumed to be negligible. Other sampling criteria are possible.

Another optional optimization is to test for pre-determined functional relationships between fields based on a library of known functions. This test can be performed on the records or on the values of the quadruples.

7.3 Functional Dependency Analysis Across Multiple Sources

In one approach for testing for functional dependency across multiple sources (e.g., database tables), profiling module 100 generates a "virtual table" that includes fields from the multiple sources. The virtual table can be generated, for example, by performing a join operation on the sources using a key field that is common to the sources.

In an example of functional dependency analysis using a virtual table, a first data source is a database of motor vehicle registration information (a motor vehicle registry (MVR) database) and a second data source is a database of issued traffic citations (a traffic citation (TC) database). The MVR database includes fields such as make, model, color, and includes a license field that is designated as a "primary key" field. Each record in the MVR database has a unique value of the license field. The TC database includes fields such as name, date, location, violation, vehicle make, vehicle model, vehicle color and includes a vehicle license field that is designated as a "foreign key" field. Each value of the vehicle license field has a corresponding record in the MVR database with that value in the license field. There may be multiple records in the TC database having the same value of the vehicle license field.

The profiling module 100 joins records from the MVR database and TC database to form a virtual table (e.g., as described above with reference to the join component 1100 shown in FIG. 11A). Each record of the virtual table has each of the fields from the two databases including a single license field that has the matched value from the MVR license field and the TC vehicle license field. A record may, however, have a value of the color field from the MVR database that is different from the value of the vehicle color field from the TC database. For example, the MVR database may use a "BLU" code to indicate the color blue and the TC database uses a "BU" code to indicate the color blue. In this case, if a vehicle has the same color in both databases, the color field will have a "one-to-one" functional relationship with the vehicle color field. Alternatively, a record may have different values for the color field and the vehicle color field if a vehicle has been painted a different color in the time between being registered and receiving a citation.

Since the joined virtual table includes fields from each of multiple data sets, the profiling module 100 can discover any of a variety of relationships that my exist between the fields in those data sets. The same or similar dependency analysis as described above can be run on fields in joined virtual table.

The approaches described above can be implemented using software for execution on a computer. For instance, the software forms procedures in one or more computer programs that execute on one or more programmed or programmable computer systems (which may be of various architectures, such as distributed, client/server, or grid) each including at least one processor, at least one data storage system (for example, volatile and non-volatile memory and/or storage elements), at least one input device or port, and at least one output device or port. The software may form one or more modules of a larger program, for example, a program that provides other services related to the design and configuration of graphs.

The software may be provided on a medium or device readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. Other embodiments are within the scope of the following claims.

What is claimed is:
1. A method for processing data including:
reading data records, in a dataflow graph, from a data source, the dataflow graph including components and links, wherein the links direct flows of data between components;
profiling the data records using the data flow graph including
sending the data records on a first link to a partitioning component, the partitioning component partitioning the data records among a plurality of partitions;
generating, in each partition, by a canonicalize component in communication with the partitioning component, a flow of census elements on a respective one of a first plurality of links including generating a plurality of census elements for each data record, each census element including:
a field of the data,
a corresponding value occurring within the field of the data record;
generating, in each partition, by a rollup component in communication with the a corresponding canonicalize component, a flow of output census elements on a respective one of a second plurality of links including combining occurrences of census elements having the same value for the same field into an output census element including the field, the value, and a count of the number of combined census elements;
combining the flows of output census elements in each partition, and partitioning the combined flow of output census elements by the field and the value;
adding counts of the number of occurrences of the same value for the same field for the partitioned flows of output census elements to produce, for each field and corresponding value, a single census element that includes a total count of occurrences of that field and corresponding value in the flow of data records;
storing profile information based on the single census elements; and
processing data from the data source, including accessing the stored profile information, reading the data from the data source after profiling the data from the data source, processing the data according to the accessed profile information, and outputting a result of the processing.
2. The method of claim 1 wherein profiling the data is performed without maintaining a copy of the data outside the data source.
3. The method of claim 2 wherein the data includes variable record structure records with at least one of a conditional field and a variable number of fields.

4. The method of claim 3 wherein profiling the data includes interpreting the variable record structure records.

5. The method of claim 1 wherein the data source includes a data storage system.

6. The method of claim 5 wherein the data storage system includes a database system.

7. The method of claim 1 wherein profiling the data includes counting a number of occurrences for each of a set of distinct values for a field.

8. The method of claim 7 wherein storing profile information includes storing statistics for the field based on the single census elements.

9. The method of claim 1 further including maintaining a metadata store that contains metadata related to the data source.

10. The method of claim 9 wherein storing the profile information includes updating the metadata related to the data source.

11. The method of claim 9 wherein profiling the data records and processing the data each make use of metadata for the data source.

12. The method of claim 1 wherein profiling the data records from the data source further includes determining a format specification based on the profile information.

13. The method of claim 1 wherein profiling the data records further includes determining a validation specification based on the profile information.

14. The method of claim 13 wherein processing the data includes identifying invalid records in the data based on the validation specification.

15. The method of claim 1 wherein profiling the data records further includes specifying data transformation instructions based on the profile information.

16. The method of claim 15 wherein processing the data records includes applying the transformation instructions to the data.

17. The method of claim 1 wherein processing the data includes importing the data into a data storage subsystem.

18. The method of claim 17 wherein processing the data includes validating the data prior to importing the data into a data storage subsystem.

19. The method of claim 18 wherein validating the data includes comparing characteristics of the data to reference characteristics for said data.

20. The method of claim 19 wherein the reference characteristics include statistical properties of the data.

21. The method of claim 1 wherein reading data includes reading the data from a parallel data source, each part of the parallel data source being processed by a different one of a first set of parallel processors and/or computers.

22. Software stored on a non-transitory computer-readable storage medium including executable instructions for causing a computer system to:
  read data records, in a dataflow graph, from a data source, the dataflow graph including components and links, wherein the links direct flows of data between components;
  profile the data records using the dataflow graph including sending the data records on a first link to a partitioning component, the partitioning component partitioning the data records among a plurality of partitions;
    generating, in each partition, a flow of census elements, by a canonicalize component in communication with the partitioning component, on a respective one of a first plurality of links including generating a plurality of census elements identifying a field and a corresponding value for each data record, each census element including:
      a field of the data,
      a corresponding value occurring within the field of the data record;
    generating, in each partition, a flow of output census elements, by a rollup component in communication with a corresponding canonicalize component; on a respective one of a second plurality of links including combining occurrences of census elements having the same value for the same field into an output census element including the field, the value, and a count of the number of combined census elements;
    combining the flows of output census elements in each partition, and partitioning the combined flow of output census elements by the field and the value;
    adding counts of the number of occurrences of the same value for the same field for the partitioned flows of output census elements to produce, for each field and corresponding value, a single census element that includes a total count of occurrences of that field and corresponding value in the flow of data records;
  store profile information based on the single census elements; and
  process data from the data source by accessing the stored profile information, reading the data from the data source after profiling the data from the data source, processing the data according to the accessed profile information, and outputting a result of the processing.

23. A data processing system including:
  a computer system, including a plurality of processors;
  a data source accessible to the computer system;
  a data storage subsystem including a non-transitory computer-readable storage medium in communication with the computer system;
  with a dataflow graph configured to execute on a plurality of the processors, the dataflow graph including components and links, wherein the links direct flows of data between components and the components including:
  a read data component configured to read data records from a data source, a first partitioning component connected to the read data component by a link and configured to partition the data records among a plurality of partitions corresponding to different processors;
  a plurality of canonicalize components, each canonicalize component in communication with the first partitioning component and configured to generate a flow of census elements including generating a plurality of census elements for each data record, each census element including:
  a field of the data,
  a corresponding value occurring within the of the data record;
  a plurality of local rollup components, each local rollup component in communication with a canonicalize component and configured to generate, in each partition, a flow of output census elements including combining occurrences of census elements having the same value for the same field into an output census element including the field, the value, and a count of the number of combined census elements;
  a second partitioning component connected to each local rollup component in the plurality of local rollup components by a link and configured to combining the flows of output census elements in each partition, and partitioning the combined flow of output census elements by the field and the value;

a plurality of global rollup components, each global rollup component connected to the second partitioning component by a link and configured to: add counts of the number of occurrences of the same value for the same field for the partitioned flows of output census elements to produce, for each field and corresponding value, a single census element that includes a total count of occurrences of that field and corresponding value in the flow of data records, and store profile information based on the single census elements; and a processing module connected over communication paths to the data source and the data storage subsystem and configured execute on the computer system to access the stored profile information, to read data from the data source after the profiling module reads the data from the data source, to process the data from the data source according to the accessed profile information, and to output a result of the processing.

24. The method of claim 1 wherein storing profile information includes storing the total count from the single element for a field and a corresponding value.

25. The method of claim 1, wherein each census element further includes a flag indicating whether the value included in the element is valid.

26. The method of claim 1, wherein each census element further includes a flag indicating whether the value included in the element corresponds to a pre-determined null value.

27. The method of claim 1 wherein the data records are filtered, by a filtering component, to limit profiling to a field of each data record.

28. The method of claim 1 wherein the data records are filtered, by a filtered component, including:
  determining that a data record is invalid; and
  sending the data record to an invalid records component on a link.

* * * * *

UNITED STATES PATENT AND TRADEMARK OFFICE
CERTIFICATE OF CORRECTION

| | | |
|---|---|---|
| PATENT NO. | : 8,868,580 B2 | Page 1 of 1 |
| APPLICATION NO. | : 10/941402 | |
| DATED | : October 21, 2014 | |
| INVENTOR(S) | : Joel Gould et al. | |

It is certified that error appears in the above-identified patent and that said Letters Patent is hereby corrected as shown below:

In the Claims

Col. 28, line 38, in claim 1, after "with" delete "the".

Col. 30, line 55, in claim 23, after "within the" add -- field --.

Signed and Sealed this
Tenth Day of March, 2015

Michelle K. Lee
*Deputy Director of the United States Patent and Trademark Office*